(12) United States Patent
Yamane et al.

(10) Patent No.: US 7,192,897 B2
(45) Date of Patent: Mar. 20, 2007

(54) NEAR-INFRARED LIGHT-ABSORBING GLASS, NEAR-INFRARED LIGHT-ABSORBING ELEMENT, NEAR-INFRARED LIGHT-ABSORBING FILTER, AND METHOD OF MANUFACTURING NEAR-INFRARED LIGHT-ABSORBING FORMED GLASS ARTICLE, AND COPPER-CONTAINING GLASS

(75) Inventors: Rie Yamane, Yokohama (JP); Youichi Hachitani, Tokyo (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 117 days.

(21) Appl. No.: 10/612,145

(22) Filed: Jul. 3, 2003

(65) Prior Publication Data
US 2004/0082460 A1    Apr. 29, 2004

(30) Foreign Application Priority Data

| Jul. 5, 2002 | (JP) | ............................ 2002-196785 |
| Aug. 19, 2002 | (JP) | ............................ 2002-238065 |
| Oct. 16, 2002 | (JP) | ............................ 2002-302052 |

(51) Int. Cl.
*C03C 3/247* (2006.01)
*C03C 3/16* (2006.01)
*C03C 3/17* (2006.01)

(52) U.S. Cl. ............................ 501/44; 501/45; 501/48

(58) Field of Classification Search ................ 501/45, 501/48, 44
See application file for complete search history.

(56) References Cited

U.S. PATENT DOCUMENTS 4,303,298 A * 12/1981 Yamashita .................. 252/587

(Continued)

*Primary Examiner*—J. A. Lorengo
*Assistant Examiner*—Elizabeth A. Bolden
(74) *Attorney, Agent, or Firm*—Sughrue Mion, PLLC

(57) ABSTRACT

Provided are near-infrared light-absorbing glass in which good color compensating characteristics are maintained even without containing harmful arsenic, permitting the thinning of the glass, and having good weatherability and forming properties; a near-infrared light-absorbing element comprised of such glass; a near-infrared light-absorbing filter employing such glass. Also provided, at low cost, are near-infrared light-absorbing glass permitting good color compensating, a near-infrared light-absorbing element comprised of such glass, and a near-infrared light-absorbing filter comprising such elements. The glass comprises cationic components with a certain composition as well as $F^-$ and $O^{2-}$ as anionic components. Alternatively, the glass is near-infrared light-absorbing glass, wherein the glass exhibits properties, based on a thickness of 0.5 mm, in the spectral transmittance of wavelengths of 400 to 700 nm, that wavelength, at which a 50 percent transmittance is exhibited, is less than 630 nm, transmittance at a wavelength longer than said wavelength is less than 50 percent, transmittance at a wavelength shorter than said wavelength is higher than 50 percent and the viscosity at a liquid phase temperature is 0.5 Pa·s or more. The near-infrared light-absorbing element is comprised of such glass. The near-infrared light-absorbing filter comprises a glass plate comprised of such glass. Alternatively, the glass is comprised of fluorophosphate glass or phosphate glass, and comprises 0.1 weight percent or more of copper based on CuO, 0.005 to 0.5 weight percent of iron based on $Fe_2O_3$, 0.01 to 1 weight percent of antimony based on $Sb_2O_3$, and no arsenic.

36 Claims, 2 Drawing Sheets

U.S. PATENT DOCUMENTS

| | | | |
|---|---|---|---|
| 4,479,819 A * | 10/1984 | Borelli et al. | 65/30.11 |
| 4,615,989 A * | 10/1986 | Ritze | 501/44 |
| 5,173,212 A * | 12/1992 | Speit et al. | 252/301.4 P |
| 5,242,868 A * | 9/1993 | Hara | 501/44 |
| 5,249,076 A * | 9/1993 | Fujiwara et al. | 359/350 |
| 5,432,573 A * | 7/1995 | Lawther et al. | 396/538 |
| 5,668,066 A * | 9/1997 | Oguma et al. | 501/45 |
| 5,750,448 A * | 5/1998 | Grabowski et al. | 501/47 |
| 6,225,244 B1 * | 5/2001 | Oguma | 501/45 |
| 6,342,460 B1 * | 1/2002 | Akimoto et al. | 501/55 |
| 2002/0072461 A1 * | 6/2002 | Akimoto et al. | 501/55 |
| 2003/0125187 A1 * | 7/2003 | Akimoto et al. | 501/54 |
| 2004/0259714 A1 * | 12/2004 | Fujiwara et al. | 501/45 |
| 2005/0054511 A1 * | 3/2005 | Fujiwara et al. | 501/45 |

\* cited by examiner

NEAR-INFRARED LIGHT-ABSORBING GLASS, NEAR-INFRARED LIGHT-ABSORBING ELEMENT, NEAR-INFRARED LIGHT-ABSORBING FILTER, AND METHOD OF MANUFACTURING NEAR-INFRARED LIGHT-ABSORBING FORMED GLASS ARTICLE, AND COPPER-CONTAINING GLASS

TECHNICAL FIELD

The present invention relates to near-infrared light-absorbing glass, a near-infrared light-absorbing element, a near-infrared light-absorbing filter, and a method of manufacturing a near-infrared light-absorbing formed glass article. More specifically, the present invention relates to near-infrared light-absorbing glass with good weatherability, forming properties, and the like that are suited to a near-infrared light-absorbing filter and the like employed in the color compensating of solid-state imaging elements such as CCDs; a near-infrared light-absorbing element comprising such a glass; a near-infrared light-absorbing filter employed as filters for color compensating and the like in digital cameras, VTR cameras, and the like; and a formed glass article comprising such infrared light-absorbing glass.

Further, the present invention relates to copper-containing fluorophosphate glass and phosphate glass, a near-infrared light-absorbing element, and a near-infrared light-absorbing filter. More specifically, the present invention relates to a near-infrared light-absorbing filter employed in the color compensating of solid-state imaging elements such as CCDs, and the like, a near-infrared light-absorbing element constituting such filters, and fluorophosphate glass and phosphate glass suited for use as starting materials of such elements.

BACKGROUND OF THE INVENTION

The spectral sensitivity of solid-state imaging elements such as CCDs employed in digital cameras and VTR cameras runs from visible range to near-infrared range around 1,100 nm. Accordingly, filters absorbing light in near-infrared range are employed to obtain images approximating the visible sensitivity of humans. As glass for this purpose, glass obtained by adding CuO to phosphate glass has been employed as filter glass, but phosphate glass has drawbacks such as poor weatherability and a tendency to develop surface roughness and clouding when exposed to high temperature and high humidity for extended periods. Thus, near-infrared light-absorbing filter glass having a basic composition in the form of fluorophosphate glass comprising a fluorine component and having good weatherability is being developed and marketed.

For example, near-infrared light-absorbing filter glass in which CuO is added to fluorophosphate glass has been disclosed as such glass (Japanese Unexamined Patent Publication (KOKAI) Heisei No. 2-204342).

With the size reduction in digital cameras and VTR cameras in recent years, a need has developed to save space in the optical systems of cameras. Thus, it has become desirable to reduce the thickness of near-infrared light-absorbing filter glass. However, when the thickness of conventional near-infrared light-absorbing filter glass is simply reduced, near-infrared light absorption decreases and the desired spectral characteristics are precluded. Thus, the quantity of coloring component must be increased to compensate for the reduced absorption caused by thickness reduction. However, increasing the concentration of copper in the above-described conventional near-infrared light-absorbing filter glass is problematic in that the copper valence changes, transmittance at near 400 nm decreases, and a blue-green coloration develops.

For example, in Example 2 of Japanese Unexamined Patent Publication (KOKAI) Heisei No. 2-204342, the transmittance for a glass thickness of 0.3 mm is given. In glasses other than glass containing $As_2O_3$, transmittance at 400 nm is much less than 80 percent. This indicates that when the glass thickness is reduced with a high concentration of copper, transmittance at 400 nm drops and a green coloration develops. In this Example, the deterioration in transmittance is corrected with $As_2O_3$. However, $As_2O_3$ is undesirable because it is a harmful component and it causes public harm when contained in sludge and waste liquid from polishing.

Further, when the amount of copper is increased, there are problems in that resistance to devitrification deteriorates, crystals tend to precipitate in glass, the liquid phase temperature increases, making it difficult to form glass, viscosity at the liquid phase temperature decreases, convection occurs in the melting glass in a formed glass, and striae tend to form.

In fluorophosphate glass, typifying near-infrared light-absorbing glass, the introduction of fluorine into phosphate glass improves weatherability. On the other hand, the introduction of fluorine also severs the network of phosphoric acid in the glass structure, resulting in reduced viscosity. There is also a drawback in that manufacturing is rendered difficult by the volatization of fluorine. In particular, in near-infrared light-absorbing glass obtained by adding copper to fluorophosphate glass, the greater the amount of copper added, the more unstable the glass becomes and the higher the liquid phase temperature becomes. Therefore, it also becomes necessary to employ a high forming temperature. When the forming temperature is set high, low-viscosity glass flows out, resulting in severe convection of glass in a mold and the development of sharp striae in the glass. Further, a high forming temperature results in the volatization of a large amount of fluorine, the fluorine concentration on the surface of the glass during forming decreases, a refractive index differential develops, and striae tend to develop in the surface. Further, when forming thick glass with large dimensions, the cooling rate was delayed, tending to result in devitrification (crystallization) of glass. For these reasons, fluorophosphate glass of high copper concentration has yielded unstable products, has produced extremely poor yields, and has been expensive, rendering mass production difficult.

As stated above, as imaging devices employing solid-state imaging elements have become widespread in recent years, the demand for filters for color compensating has increased. For example, filters for color compensating are installed in high-cost items such as high-end video cameras as well as relatively inexpensive items such as portable telephones with camera functions. Thus, the need has been increasing to supply a filter material in the form of glass having a near-infrared light-absorbing function with stable performance, in large quantities, and at low cost.

Copper-containing fluorophosphate glass is known as near-infrared light-absorbing glass (Japanese Examined Patent Publication (KOKOKU) Heisei No. 6-43254). However, in order to keep a high transmittance especially at wavelengths around 400 nm in the glass described in Japanese Examined Patent Publication (KOKOKU) Heisei No.

6-43254, it is required to use high-purity, optical glass-grade materials. Therefore, there is a problem in the form of high cost.

Further, in order to reduce the cost of glass, the cost reduction of starting materials by reducing the grade of the starting materials have been considered. However, the use of low-grade starting materials is problematic in that transmittance in the visible wavelength range, particularly transmittance at 400 nm, is decreased. When transmittance decreases even slightly at a wavelength of 400 nm, even by visual observation, the glass is observed to assume a deeper blue color, and thus it becomes difficult to conduct good color compensating. To eliminate such decreases in transmittance, it is conceivable that the thickness of the glass is reduced. However, for filters for color compensating, there is a requirement that color compensating be conducted with good balance over the entire wavelength range of sensitivity of the imaging element. When the thickness of the glass is reduced, good correction of sensitivity at other wavelengths is precluded.

Further, it is becoming impossible to respond to the current surge in demand for glass for color compensating in solid-state imaging elements simply by using high-purity glass starting materials. Accordingly, there is a need to reduce the grade of glass starting materials not simply to reduce cost, but also to meet the increasing demand for glass for color compensating.

The first object of the present invention is to provide near-infrared light-absorbing glass in which the drawbacks of such conventional near-infrared light-absorbing glass have been eliminated, in which good color compensating characteristics are maintained even without containing harmful arsenic, permitting the thinning of the glass, and having good weatherability and forming properties; a near-infrared light-absorbing element comprising such glass; a near-infrared light-absorbing filter employing such glass; and a method of manufacturing high-quality formed glass articles comprising such near-infrared light-absorbing glass.

The second object of the present invention is to provide, at low cost, near-infrared light-absorbing glass permitting good color compensating, a near-infrared light-absorbing element comprising such glass, and a near-infrared light-absorbing filter equipped with such elements.

SUMMARY OF THE INVENTION

The present inventors conducted extensive research to achieve the above-stated first object, resulting in the discovery that it could be attained in the form of near-infrared light-absorbing glass having specific composition, and in the form of near-infrared light-absorbing glass having specific transmittance characteristics. The first aspect of the present invention was devised on the basis of this discovery.

That is, the first aspect of the present invention provides (1) near-infrared light-absorbing glass (referred to near-infrared light-absorbing glass I, hereinafter) comprising, denoted as cationic percentages, 23 to 41 percent of $P^{5+}$, 4 to 16 percent of $Al^{3+}$, 11 to 40 percent of $Li^+$, 3 to 13 percent of $Na^+$, 12 to 53 percent of $R^{2+}$ (where $R^{2+}$ denotes the total of $Mg^{2+}$, $Ca^{2+}$, $Sr^{2+}$, $Ba^{2+}$, and $Zn^{2+}$), and 2.6 to 4.7 percent of $Cu^{2+}$, and $F^-$ and $O^{2-}$ as anionic components;

(2) The near-infrared light-absorbing glass according to (1), wherein the glass comprises $Zn^{2+}$ as a cationic component;

(3) The near infrared light-absorbing glass according to (1), wherein the glass comprises, denoted as anionic percentages, 25 to 48 percent of $F^-$ and 52 to 75 percent of $O^{2-}$;

(4) Near-infrared light-absorbing glass (referred to near-infrared light-absorbing glass II, hereinafter) essentially comprising no arsenic and lead, wherein, in the spectral transmittance of wavelengths of 400 to 700 nm, a thickness of the glass, exhibiting a property that wavelength at which a 50 percent transmittance is exhibited is 615 nm, ranges from 0.1 to 0.8 mm as well as, at a thickness at which the glass exhibits said property, a transmittance at a wavelength of 400 nm is 80 percent or more, a transmittance at a wavelength of 800 to 1000 nm is less than 5 percent, and a transmittance at a wavelength of 1200 nm is less than 20 percent;

(5) The near-infrared light-absorbing glass according to (1), wherein the glass has a liquid phase temperature of 750° C. or less;

(6) The near-infrared light-absorbing glass according to (4), wherein the glass has a liquid phase temperature of 750° C. or less;

(7) Near-infrared light-absorbing glass (referred to near-infrared light-absorbing glass III, hereinafter), wherein the glass exhibits properties, based on a thickness of 0.5 mm, in the spectral transmittance of wavelengths of 400 to 700 nm, that wavelength, at which a 50 percent transmittance is exhibited, is less than 630 nm, transmittance at a wavelength longer than said wavelength is less than 50 percent, transmittance at a wavelength shorter than said wavelength is higher than 50 percent and the viscosity at a liquid phase temperature is 0.5 Pa·s or more;

(8) The near-infrared light-absorbing glass according to (4) which is copper-containing fluorophosphate glass.

(9) The near-infrared light-absorbing glass according to (7) which is copper-containing fluorophosphate glass.

(10) A near-infrared light-absorbing element comprised of the near-infrared light-absorbing glass according to (1);

(11) A near-infrared light-absorbing element comprised of the near-infrared light-absorbing glass according to (4);

(12) A near-infrared light-absorbing element comprised of the near-infrared light-absorbing glass according to (7);

(13) A near-infrared light-absorbing filter comprising a glass plate comprised of the near-infrared light-absorbing glass according to (1);

(14) A near-infrared light-absorbing filter comprising a glass plate comprised of the near-infrared light-absorbing glass according to (4);

(15) A near-infrared light-absorbing filter comprising a glass plate comprised of the near-infrared light-absorbing glass according to (7);

(16) A method of manufacturing a near-infrared light-absorbing formed glass article, wherein melted glass having a temperature of 710° C. or less is formed and cooled to manufacture a formed glass article comprised of the near-infrared light-absorbing glass according to (7).

The second aspect of the present invention provides copper-containing glass comprised of fluorophosphate glass or phosphate glass comprising 0.1 weight percent or more of copper based on CuO, 0.005 to 0.5 weight percent of iron based on $Fe_2O_3$, 0.01 to 1 weight percent of antimony based on $Sb_2O_3$, and no arsenic.

The aforementioned glass of the second aspect of the present invention is also copper-containing glass, wherein the glass exhibits properties, in the spectral transmittance of wavelengths of 400 to 1,200 nm, based on a thickness of 0.45 nm, that wavelength ($\lambda_{50}$), at which a 50 percent transmittance is exhibited, ranges from 605 to 625 nm, transmittance at a wavelength of 400 nm is 80 percent or more, and transmittance at a wavelength of 1200 nm is less than 22 percent.

Further, the aforementioned glass of the second aspect comprises, denoted as cationic percentages,

| | |
|---|---|
| $P^{5+}$ | 11 to 43 percent |
| $Al^{3+}$ | 4 to 16 percent |
| $R_1^+$ | 0.1 to 43 percent |
| (where $R_1^+$ is the total of $Li^+$, $Na^+$, and $K^+$) | |
| $R_2^{2+}$ | 12 to 53 percent |
| (where $R_2^{2+}$ is the total of $Mg^{2+}$, $Ca^{2+}$, $Sr^{2+}$, $Ba^{2+}$, and $Zn^{2+}$) | |
| $Cu^{2+}$ | 1.0 to 4.7 percent, | as well as comprises $F^-$ and $O^{2-}$ as anionic components, and preferably does not comprise a nitrate.

The second aspect of the present invention also provides a near-infrared light-absorbing element comprised of the copper-containing glass of the second aspect of the present invention.

The second aspect of the present invention also provides a near-infrared light-absorbing filter comprising the near-infrared light-absorbing element of the second aspect of the present invention.

[The First Aspect]

Figure 1:
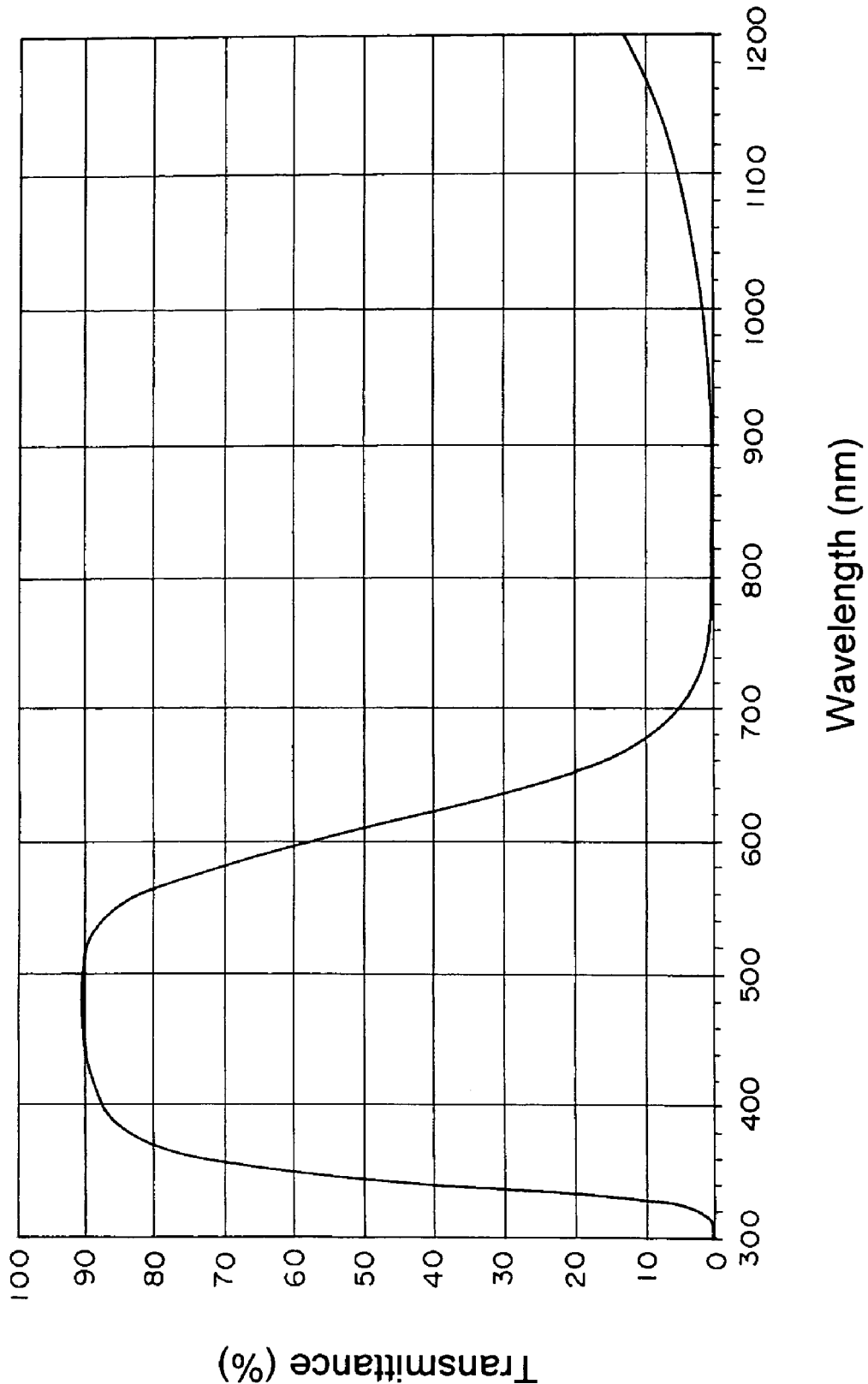
FIG. 1 is a graph showing the spectral transmittance curve of an example of the near-infrared light-absorbing glass of the first aspect of the present invention.
Figure 2:
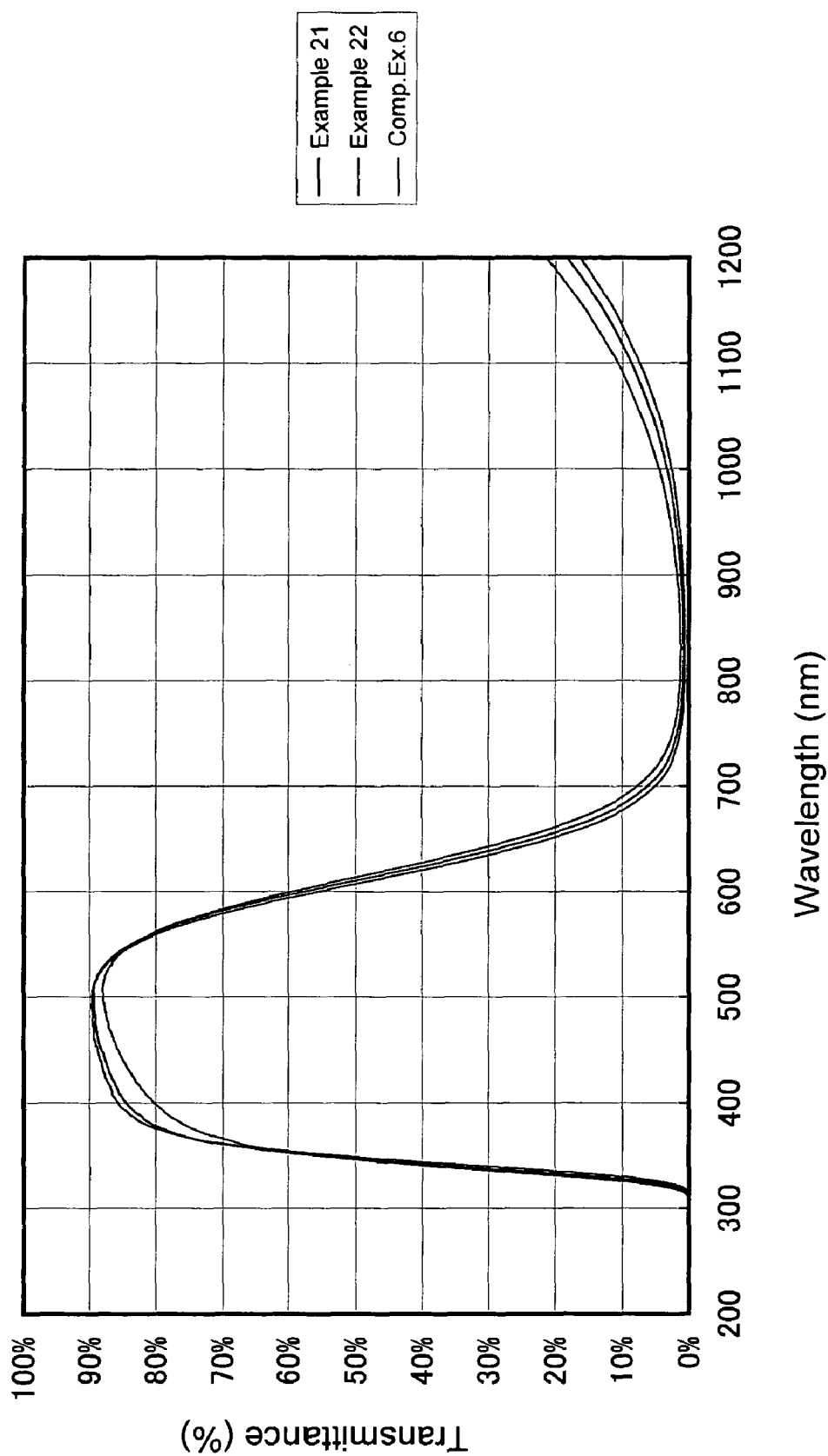
FIG. 2 shows the spectral transmittance curves of the glasses of Embodiments 21 and 22 and Comparative Example 6.

The near-infrared light-absorbing glass of the first aspect of the present invention has three modes, denoted below as near-infrared light-absorbing glasses I, II, and III. Near-infrared light-absorbing glass I will be described first.

The near-infrared light-absorbing glass of the first aspect of the present invention comprises, denoted as cationic percentages, 23 to 41 percent of $P^{5+}$, 4 to 16 percent of $Al^{3+}$, 11 to 40 percent of $Li^+$, 3 to 13 percent of $Na^+$, 12 to 53 percent of $R^{2+}$ (where $R^{2+}$ denotes the total of $Mg^{2+}$, $Ca^{2+}$, $Sr^{2+}$, $Ba^{2+}$, and $Zn^{2+}$), and 2.6 to 4.7 percent of $Cu^{2+}$, as well as $F^-$ and $O^{2-}$ as anionic components.

Glass I is a fluorophosphate glass in which a prescribed quantity of copper is added to a base composition the copper valence of which tends not to change even when the copper concentration, with its important role in light-absorption characteristics, is varied, yielding good absorption characteristics in the near-infrared range and exhibiting a high transmittance at a wavelength of 400 nm. From this perspective, the anionic component of the glass is preferably comprised of $F^-$ and $O^{2-}$.

The reasons for limiting the composition of glass I are stated below. In the description given below, including but not limited to the description of glass I, the cationic component content is denoted as a cationic percentage and the anionic component content as an anionic percentage.

$P^{5+}$ is a basic component of fluorophosphate glass and is an important component in imparting absorption in the infrared range. At less than 23 percent, the color compensating function deteriorates and a green coloration results. Conversely, when 41 percent is exceeded, weatherability and resistance to devitrification deteriorate. Accordingly, the $P^{5+}$ content is limited to 23 to 41 percent, preferably 25 to 40 percent.

$Al^{3+}$ is an important component of fluorophosphate glass in improving resistance to devitrification. At less than 4 percent, resistance to devitrification is poor, the liquid phase temperature increases, and it becomes difficult to melt and form high-quality glass. Conversely, when 16 percent is exceeded, resistance to devitrification deteriorates. Accordingly the $Al^{3+}$ content is limited to 4 to 16 percent, preferably 8 to 16 percent.

$Li^+$ is a useful component for enhancing the resistance to devitrification of the glass. At less than 11 percent, such an effect is not achieved. Conversely, when 40 percent is exceeded, the durability and processability of the glass deteriorate. Accordingly, the $Li^+$ content is limited to 11 to 40 percent, preferably 11 to 25 percent.

$Na^+$ is also a useful component for enhancing the resistance to devitrification of the glass. At less than 3 percent, such an effect is not achieved, and when 13 percent is exceeded, the durability and processability of the glass deteriorate. Accordingly, the content of $Na^+$ is limited to 3 to 13 percent, preferably 4 to 13 percent.

In fluorophosphate glass, $R^{2+}$ ($Mg^{2+}$, $Ca^{2+}$, $Sr^{2+}$, $Ba^{2+}$, and $Zn^{2+}$) is a useful component for enhancing the resistance to devitrification, durability, and processability of the glass. When the total $R^{2+}$ content is less than 12 percent, the resistance to devitrification and durability of the glass deteriorate. Conversely, when 53 percent is exceeded, resistance to devitrification deteriorates. Accordingly, the $R^{2+}$ content is limited to 12 to 53 percent, preferably 15 to 35 percent.

The desirable range of $Mg^{2+}$ is 2 to 6 percent. The desirable range of $Ca^{2+}$ is 6 to 12 percent. The desirable range of $Sr^{2+}$ is 4 to 9 percent. The desirable range of $Ba^{2+}$ is 3 to 8 percent. And the desirable range of $Zn^{2+}$ is greater than 0 percent and 6 percent or less.

$Zn^{2+}$ is an optional component that is preferably incorporated to enhance resistance to devitrification. From this perspective, the desirable range of $Zn^{2+}$ is greater than 0 and 6 percent or less, the preferred range being from 2 to 6 percent.

$Cu^{2+}$ is a component playing an important role in light absorption characteristics. At less than 2.6 percent, there is little infrared absorption, and the wavelength, at which a 50 percent transmittance based on a thickness of 0.5 mm is exhibited in a wavelength range of 400 to 700, is 630 nm or more. When employed in a filter for a solid-state imaging element, good color compensating is difficult. Conversely, when 4.7 percent is exceeded, resistance to devitrification deteriorates. Thus, the $Cu^{2+}$ content is limited to 2.6 to 4.7 percent, preferably 2.8 to 4.7 percent.

$Sb^{3+}$ and $Ce^{4+}$ can be added as optional components. These are useful components for enhancing transmittance of the glass over the short wavelength range, particularly at a wavelength of 400 nm. The quantity added is preferably 0 to 1 percent (cationic percentages) for each, more preferably 0.001 to 1 percent, and further preferably, 0.001 to 0.1 percent. When both $Sb^{3+}$ and $Ce^{4+}$ are incorporated simultaneously, the total thereof is preferably less than 1 percent. Among $Sb^{3+}$ and $Ce^{4+}$, $Sb^{3+}$ is particularly useful for enhancing transmittance over the short wavelength range, and $Sb^{3+}$ alone is preferably incorporated in order to enhance transmittance over the short wavelength range. It is possible to incorporate $Sb^{3+}$ (for example, $Sb_2O_3$) to prevent a decrease in transmittance of wavelengths around 400 nm even when impurities such as iron are present in the glass starting materials.

$O^{2-}$ is an anionic component of particular importance in glass I. At less than 52 percent, bivalent $Cu^{2+}$ tends to be reduced to monovalent $Cu^+$, and thus absorption in the short wavelength area, particularly absorption around 400 nm, increases, tending to result in a green coloration. Accordingly, the $O^{2-}$ content is preferably 52 to 75 percent, more preferably 53 to 75 percent.

$F^-$ is an important anionic component for lowering the melting point of the glass and enhancing weatherability. At less than 25 percent, weatherability tends to deteriorate. Conversely, when 48 percent is exceeded, the $O^{2-}$ content decreases, tending to result in coloration around 400 nm due to monovalent $Cu^+$. Accordingly, the $F^-$ content is preferably 25 to 48 percent, more preferably 25 to 47 percent.

$K^+$, $Zr^{4+}$, $La^{3+}$, $Gd^{3+}$, $Y^{3+}$, $Si^{4+}$, and $B^{3+}$ may be suitably employed to enhance resistance to devitrification, adjust glass viscosity, adjust transmittance, and clarify. At least one cationic component selected from this group can be employed in a total quantity of less than 5 percent, preferably less than 2 percent.

The preferred composition of glass I is as given above. A number of examples thereof will be given below.

(1) Glass I-a-1

Glass I comprising 25 to 48 percent of $F^-$ and 52 to 75 percent of $O^{2-}$.

(2) Glass I-a-2

Glass I comprising 25 to 47 percent of $F^-$ and 53 to 75 percent of $O^{2-}$.

(3) Glass I-b-1

Glass I comprising $Zn^{2+}$ as cationic component.

(4) Glass I-b-2

Glass I comprising $P^{5+}$, $Al^{3+}$, $Li^+$, $Na^+$, $Mg^{2+}$, $Ca^{2+}$, $Sr^{2+}$, $Ba^{2+}$, $Zn^{2+}$, and $Cu^{2+}$ as cationic components and $F^-$ and $O^{2-}$ as anionic components.

(5) Glass I-c-1

Glass I essentially not comprising arsenic and lead. The term "essentially not comprising" means that these elements are not employed as glass starting materials, and are preferably removed when contained as impurities.

Arsenic and lead are harmful substances and are preferably removed due to their environmental influences. Since these harmful components are not contained in wastes (polishing sludge, polishing waste liquid, or the like) produced by the mechanical processing of these glasses by grinding, polishing, cutting, or the like, the environmental influence can be reduced.

(6) Glass I-c-2

Glass I essentially not comprising arsenic, cerium, and lead.

(7) Glass I-d-1

Glass I comprising 2 to 6 percent of $Mg^{2+}$, 6 to 12 percent of $Ca^{2+}$, 4 to 9 percent of $Sr^{2+}$, 3 to 8 percent of $Ba^{2+}$, and 0 to 6 percent of $Zn^{2+}$ as $R^{2+}$ components.

(8) Glass I-d-2

Glass I comprising 2 to 6 percent of $Mg^{2+}$, 6 to 12 percent of $Ca^{2+}$, 4 to 9 percent of $Sr^{2+}$, 3 to 8 percent of $Ba^{2+}$, and more than 0 percent and 6 percent or less of $Zn^{2+}$ as $R^{2+}$ components.

(9) Glass I-d-3

Glass I comprising 2 to 6 percent of $Mg^{2+}$, 6 to 12 percent of $Ca^{2+}$, 4 to 9 percent of $Sr^{2+}$, 3 to 8 percent of $Ba^{2+}$, and 2 to 6 percent of $Zn^{2+}$ as $R^{2+}$ components.

(10) Glass I-e-1

Glass I comprising 25 to 40 percent of $P^{5+}$, 8 to 16 percent of $Al^{3+}$, 11 to 25 percent of $Li^+$, 4 to 13 percent of $Na^+$, and 15 to 35 percent of $R^{2+}$ as cationic components.

(11) Glass I-e-2

Glass I comprising 25 to 40 percent of $P^{5+}$, 8 to 16 percent of $Al^{3+}$, 11 to 25 percent of $Li^+$, 4 to 13 percent of $Na^+$, 15 to 35 percent of $R^{2+}$, and more than 0 percent and 6 percent or less of $Zn^{2+}$ as cationic components.

(12) Glass I-e-3

Glass I comprising 25 to 40 percent of $P^{5+}$, 8 to 16 percent of $Al^{3+}$, 11 to 25 percent of $Li^{30}$, 4 to 13 percent of $Na^{30}$, 15 to 35 percent of $R^{2+}$, and 2 to 6 percent of $Zn^{2+}$ as cationic components.

(13) Glass I-f

Glass I comprising 2.8 to 4.7 percent of $Cu^{2+}$ as a cationic component.

(14) Glass I-g-1

Glass I comprising 0 to 1 percent of $Sb^{3+}$ as a cationic component.

(15) Glass I-g-2

Glass I comprising 0.001 to 0.1 percent of $Sb^{3+}$ as a cationic component.

The characteristics of glass I will be described below.

(Transmittance Characteristics)

The transmittance of glass changes with thickness. However, in homogeneous glass, knowing the thickness and the transmittance of the glass in the direction in which the light passes makes it possible to calculate the transmittance for a prescribed thickness. As for the transmittance characteristics of glass I, glass I preferably exhibits properties, based on a thickness of 0.5 mm, in the spectral transmittance of wavelengths of 400 to 700 nm, that wavelength (denoted hereinafter as $\lambda_{50}$ (0.5 mm)), at which a 50 percent transmittance is exhibited, is less than 630 nm. When measuring the spectral transmittance, samples that have been optically polished on both sides are employed. Such a transmittance is also referred to as an external transmittance, and includes the reduction in transmittance due to reflection at the sample surfaces. Further, it is desirable that there is only one $\lambda_{50}$ (t=0.5 mm) wavelength in the wavelengths of 400 to 700 nm. Further, within wavelengths of 400 to 700 nm, it is desirable that the transmittance is higher than 50 percent at any wavelength shorter than $\lambda_{50}$ (t=0.5 mm), and the transmittance is lower than 50 percent at any wavelength longer than $\lambda_{50}$ (t=0.5 mm)

Based on a thickness of 0.5 mm, the long wavelength end of the wavelength range at which the transmittance is 50 percent or more is preferably less than 630 nm, with this long wavelength end preferably falling within a range of 605 to 625 nm. Further, based on the above-stated thickness, it is desirable for the transmittance at a wavelength of 400 nm to be 80 percent or more. Such characteristics provide a good color compensating function.

Further, in the spectral transmittance of wavelengths of 400 to 700 nm, a thickness of the glass, glass I preferably exhibits a property that wavelength at which a 50 percent transmittance is exhibited is 615 nm, ranges from 0.1 to 0.8 mm as well as, at a thickness at which the glass exhibits said property, a transmittance at a wavelength of 400 nm is 80 percent or more, a transmittance at a wavelength of 800 to 1000 nm is less than 5 percent, and a transmittance at a wavelength of 1200 nm is less than 20 percent. Further, glass I further preferably exhibits a property that wavelength ($\lambda_{50}$) at which a 50 percent transmittance is exhibited is 615 nm, ranges from 0.3 to 0.6 mm. It is further preferable that the aforementioned transmittance characteristics are achieved at this thickness.

The spectral transmittance curve of near-infrared light-absorbing glass I of the first aspect of the present invention is typified by the example given in FIG. 1. Based on the thickness where $\lambda_{50}$ is a wavelength of 615 nm, another wavelength serving as $\lambda_{50}$ is present in the ultraviolet range. Denoting the $\lambda_{50}$ in the visible range as $\lambda_{50}$ (visible) and the $\lambda_{50}$ in the ultraviolet range as $\lambda_{50}$ (ultraviolet), $\lambda_{50}$ (ultraviolet) is preferably present within a range of approximately 320 to 360 nm. Within the wavelength range from $\lambda_{50}$ (ultraviolet) to $\lambda_{50}$ (visible), as the wavelength becomes longer, the transmittance first increases monotonically, then decreases monotonically to 50 percent at $\lambda_{50}$ (visible). Within this range, a transmittance of 50 percent or more is exhibited. This is unrelated to the thickness of the glass. At the above-stated thickness, the transmittance at a wavelength of 400 nm is preferably 80 percent or more. As the wavelength becomes longer from $\lambda_{50}$ (visible) to 800 nm, the transmittance decreases monotonically. In the spectral transmittance from wavelengths of 400 to 1,200 nm, the transmittance reaches its lowest level in the range of wavelengths from 800 to 1,000 nm. Although this range is in the near-infrared range, the sensitivity of semiconductor imaging elements is not adequately low and thus it is necessary to suppress the transmittance of filters for color compensating to an adequately low level. Since the sensitivity of semiconductor imaging elements at wavelengths from 1,000 to 1,200 nm is lower than that in the wavelength range below 1,000 nm, the upper limit of transmittance is reduced. Accordingly, so long as the transmittance remains below a prescribed level, it does not matter if the transmittance increases monotonically with wavelength over the wavelength range of 1,000 to 1,200 nm.

A refractive index nd around 1.5 and an Abbé number vd around 74.5 can be obtained in near-infrared light-absorbing glass I.

Due to these transmittance characteristics, a filter employing near-infrared light-absorbing glass I can perform good color compensating in solid-state imaging elements and the like.

(Weatherability)

Good weatherability is required to withstand long-term use. When weatherability is poor, fogging occurs on the surface of the glass and it cannot be employed in applications such as optical filters.

Near-infrared light-absorbing glass I has both good transmittance characteristics and weatherability. Weatherability is tested by maintaining an optically polished glass sample at 80° C. and a relative humidity of 90 percent in a high-temperature, high-humidity vat for 1000 hours and then visibly inspecting the dimming state of the optically polished surface of the sample. As a result, if the dimming state is not observed, good weatherability to withstand long periods of use are confirmed. Near-infrared light-absorbing glass I exhibited no dimming state under the above-stated conditions, and thus good weatherability was confirmed.

(Resistance to Devitrification)

Since near-infrared light-absorbing glass I is employed in optical filters and the like, it has transmittance characteristics that are regulated in the above-stated manner. However, when crystallization occurs in the glass during the manufacturing process, transmittance characteristics are negatively affected. Accordingly, resistance to devitrification is an important characteristic to be imparted to near-infrared light-absorbing glass I. Resistance to devitrification can be evaluated based on the liquid phase temperature. An increase in resistance to devitrification corresponds to a drop in the liquid phase temperature. When the liquid phase temperature increases, the forming temperature must be increased to avoid devitrification in the course of forming glass articles from a melted near-infrared light-absorbing glass I. At the same time, there are problems in that forming of the glass becomes difficult, the viscosity of the glass during forming decreases, convection appears in the melted glass being formed into a glass article to cause striae, severe volatization occurs from the glass to degenerate the surface of the formed glass article, and volatizing substances adhere to and contaminate the mold.

In conventional glass, when the Cu amount is increased to impart the above-stated transmittance characteristics, the liquid phase temperature increases and thus the above-stated problems occur. By contrast, in near-infrared light-absorbing glass I, while achieving good transmittance characteristics, it is possible to keep the liquid phase temperature at or below 750° C., preferably at or below 720° C., more preferably at or below 700° C., still more preferably at or below 690° C., even more preferably at or below 680° C., still more preferably at or below 670° C., and even more preferably at or below 650° C. When the liquid phase temperature is within this range, the range within which forming conditions can be selected is broad and good near-infrared light-absorbing glass is readily achieved.

The liquid phase temperature is measured by placing multiple glass samples in a platinum crucible and maintaining the samples for one hour under different temperatures at fixed intervals. Subsequently, the crystals in the samples are observed by microscopy or the like and the maximum temperature at which the crystals disappear is adopted as the liquid phase temperature.

Further, since the glass transition temperature of near-infrared light-absorbing glass I is generally 550° C. or less, it is possible to form optical elements such as lenses and diffraction gratings by precision press molding (forming with a mold) without mechanical processing such as grinding or polishing of optically functional surfaces following molding.

Near-infrared light-absorbing glass II of the first aspect of the present invention will be described below.

Near-infrared light-absorbing glass II of the first aspect of the present invention is glass essentially comprising no arsenic and lead, wherein, in the spectral transmittance of wavelengths of 400 to 700 nm, a thickness of the glass, exhibiting a property that wavelength at which a 50 percent transmittance is exhibited is 615 nm, ranges from 0.1 to 0.8 mm, as well as, at a thickness at which the glass exhibits said property, a transmittance at a wavelength of 400 nm is 80 percent or more, a transmittance at a wavelength of 800 to 1000 nm is less than 5 percent, and a transmittance at a wavelength of 1200 nm is less than 20 percent.

Here, the term "essentially comprising no arsenic and lead" means, as mentioned in the description of above-described near-infrared light-absorbing glass I, that such elements are not employed as glass starting materials and are preferably removed when contained as impurities.

If the glass has the above-stated transmittance characteristics, it can be readily employed in the color compensating filters of solid-state imaging elements and the like even when thickness is reduced. From this perspective, the long wavelength end of the wavelength range over which the transmittance is 50 percent at the above-stated thickness is preferably 615 nm. Further, when the wavelength at which a transmittance of 50 percent is exhibited falls within a range of 605 to 625 nm in the spectral transmittance of wavelengths of 400 to 700 nm, the thickness of near-infrared light-absorbing glass II preferably falls within a range of 0.1 to 0.8 mm.

Further, with preferable glass II, in the spectral transmittance of wavelengths of 400 to 700 nm, a thickness of the glass, exhibiting a property that wavelength at which a 50 percent transmittance is exhibited is 615 nm, ranges from 0.1 to 0.8 mm as well as, at a thickness at which the glass exhibits said property, a transmittance at a wavelength of 400 nm is 80 percent or more, a transmittance at a wavelength of 800 to 1000 nm is less than 5 percent, and a transmittance at a wavelength of 1200 nm is less than 20 percent. With further preferable glass II, a thickness of the glass, exhibiting a property that wavelength ($\lambda_{50}$) at which a 50 percent transmittance is exhibited is 615 nm, ranges from 0.3 to 0.6 mm. It is further preferable that the aforementioned transmittance characteristics are achieved within this thickness range.

Further, it is preferable that near-infrared light-absorbing glass II also achieves the same various transmittance characteristics as those preferably achieved by above-described near-infrared light-absorbing glass I.

Copper-containing fluorophosphate glass is an example of the specific composition of above-described near-infrared light-absorbing glass II.

The preferred compositions are identical to those of near-infrared light-absorbing glass I. Among those compositions, those of greater preference are the glasses described under glasses I-a to I-f. Suitable combinations thereof are also identical to those mentioned in the description of near-infrared light-absorbing glass I.

In near-infrared light-absorbing glass II, for the same reasons as in near-infrared light-absorbing glass I, it is desirable to keep the liquid phase temperature at or below 750° C., preferably at or below 720° C., more preferably at or below 700° C., still more preferably at or below 690° C., even more preferably at or below 680° C., still more preferably at or below 670° C., and even more preferably at or below 650° C. The liquid phase temperature is measured in the same manner as described for near-infrared light-absorbing glass I. Detail of weatherability of near-infrared light-absorbing glass II is also identical to that of near-infrared light-absorbing glass I.

An example of the method of manufacturing near-infrared light-absorbing glasses I and II of the present invention will be described below.

Both near-infrared light-absorbing glasses I and II of the first aspect of the present invention are manufactured by the same method as those for preparing conventional copper-containing fluorophosphate glasses. That is, starting materials in the form of phosphates, fluorides, carbonates, nitrates, oxides and the like are weighed out to yield the desired composition and mixed, after which they are melted in a platinum crucible at 750 to 900° C., preferably at 850° C. or less. In this process, a platinum cover or the like is preferably employed to suppress volatization of the fluorine component. Although the melting may be carried out in the atmosphere, it is preferably carried out in an oxygen atmosphere to suppress a change in the valence of the copper, or oxygen is preferably bubbled in the melted glass. The melted glass is stirred and clarified to obtain homogenized melted glass free of bubbles.

After stirring and clarifying the melted glass, the glass is flowed out and formed. When the temperature is decreased to around the liquid phase temperature and the glass viscosity is increased before flowing out the glass, convection tends not to occur and striae tend not to form in the glass.

A conventionally employed method such as casting, pipe flowing, rolling, or pressing may be employed to form the glass. The formed glass is transferred to an annealing furnace preheated to around the transition temperature of the glass and gradually cooled to room temperature.

Near-infrared light-absorbing glass III of the first aspect of the present invention, exhibits properties, based on a thickness of 0.5 mm, in the spectral transmittance of wavelengths of 400 to 700 nm, that wavelength, at which a 50 percent transmittance is exhibited, is less than 630 nm, transmittance at a wavelength longer than said wavelength is less than 50 percent, transmittance at a wavelength shorter than said wavelength is higher than 50 percent and the viscosity at a liquid phase temperature is 0.5 Pa·s or more.

Based on a thickness of 0.5 mm, within the wavelength range of from 400 to 700 nm, good near-infrared light-absorbing characteristics can be imparted by making a transmittance at a wavelength longer than $\lambda_{50}$ (t=0.5 mm), that is a wavelength where a 50 percent transmittance is exhibited, less than 50 percent. Further, good visible light-passing characteristics can be imparted by making a transmittance at a wavelength shorter than $\lambda_{50}$ (t=0.5 mm) higher than 50 percent. To improve these visible light-passing characteristics, a spectral transmittance at 400 nm of 80 percent or more, based on a thickness of 0.5 mm, is desirable. Imparting good near-infrared light-absorbing characteristics and visible light-passing characteristics yields near-infrared light-absorbing glass having an adequate color compensating function even at reduced thickness. This color compensating function is suited for application to the color compensating of the solid-state imaging elements described further below, particularly semiconductor imaging elements such as CCDs. Before describing in detail the light-passing characteristics of near-infrared light-absorbing glass III, other properties of glass III will be described.

Near-infrared light-absorbing glass is mainly employed as optical glass and thus must satisfy extremely high quality requirements. Therefore, drawbacks such as striae and devitrification of the glass must be eliminated. Striae can result from a variety of factors. It is assumed that, when forming a melted glass, convection of the glass within the viscous flow temperature range is the main cause. When the viscosity is low during forming, this convection is marked and striae tend to appear. Since the glass viscosity generally tends to increase as the temperature decreases, glass convection can be reduced by decreasing the temperature during forming. However, when the temperature of the melted glass is decreased, the risk of glass devitrification by crystallization increases. That is, in order to prevent both striae and devitrification, attention must be paid to the viscosity of the glass at the liquid phase temperature, which is an indicator of the resistance to devitrification.

In near-infrared light-absorbing glass III of the first aspect of the present invention, imparting a viscosity to the glass at the liquid phase temperature of 0.5 Pa·s or more makes it possible to prevent striae caused by glass convection without devitrification of the glass during forming. The glass viscosity at the liquid phase temperature is preferably 1 Pa·s or more, more preferably 1.5 Pa·s or more.

To eliminate striae and devitrification, a liquid phase temperature of 690° C. or less is desirable, with 680° C. or less being preferred, 670° C. or less being more preferred, and 650° C. or less being even more preferred.

Copper-containing fluorophosphate glass is desirable as the near-infrared light-absorbing glass III. In fluorophosphate glass, the incorporation of fluorine into phosphate glass enhances weatherability.

The introduction of arsenic is conceivable to improve light transmittance characteristics, to remove bubbles, and to clarify. However, since arsenic is a toxic substance, a glass that essentially does not contain arsenic is desirable for environmental reasons. Similarly, glass that essentially does not contain lead is also desirable.

In the near-infrared light-absorbing glass III, the glass viscosity at the liquid phase temperature is 0.5 Pa·s or more. Thus, even when forming at a temperature around the liquid phase temperature, glass convection is suppressed in the mold. In particular, in the above-described copper-containing fluorophosphate glass, even when the concentration of copper is increased in order to impart the desired light-transmittance characteristics, convection in the glass is suppressed due to the above-described viscosity characteristics, making it possible to prevent the formation of striae. Further, since it is possible to lower the liquid phase temperature to 690° C. or less, there is little volatization of fluorine and striae can be suppressed on the surface of the formed glass.

The same compositions as in above-described near-infrared light-absorbing glass I are examples of desirable compositions of near-infrared light-absorbing glass III.

The characteristics of near-infrared light-absorbing glass III will be described below.

(Transmittance Characteristics)

As for the transmittance characteristics of near-infrared light-absorbing glass III are, as set forth above, based on a thickness of 0.5 mm, in the spectral transmittance of wavelengths of 400 to 700 nm, the $\lambda_{50}$ (0.5 mm) is less than 630 nm. It is desirable that there is only one $\lambda_{50}$ (t=0.5 mm) wavelength in the wavelengths of 400 to 700 nm. Further, within wavelengths of 400 to 700 nm, it is desirable that the transmittance is higher than 50 percent at any wavelength shorter than $\lambda_{50}$ (t=0.5 mm), and the transmittance is lower than 50 percent at any wavelength longer than $\lambda_{50}$ (t=0.5 mm). Further, it is also desirable that, based on this thickness, the transmittance at a wavelength of 400 nm is 80 percent or more. Such characteristics provide a good color compensating function.

Further, in the spectral transmittance of wavelengths of 400 to 700 nm, with preferable glass III, a thickness of the glass, exhibiting a property that wavelength at which a 50 percent transmittance is exhibited is 615 nm, ranges from 0.1 to 0.8 mm as well as, at a thickness at which the glass exhibits said property, a transmittance at a wavelength of 400 nm is 80 percent or more, a transmittance at a wavelength of 800 to 1000 nm is less than 5 percent, and a transmittance at a wavelength of 1200 nm is less than 20 percent. Further, glass III further preferably have a thickness exhibiting a property that wavelength ($\lambda_{50}$) at which a 50 percent transmittance is exhibited is 615 nm, ranges from 0.3 to 0.6 mm. It is further preferable that the aforementioned transmittance characteristics are achieved at a thickness within the above range.

The spectral transmittance curve of near-infrared light-absorbing glass III of the first aspect of the present invention is typified by the example given in FIG. 1. As in the above-described near-infrared light-absorbing glass I, based on the thickness where the wavelength ($\lambda_{50}$) (where a 50 percent transmittance is exhibited) is a wavelength of 615 nm, another wavelength serving as $\lambda_{50}$ is present in the ultraviolet range. Denoting the $\lambda_{50}$ in the visible range as $\lambda_{50}$ (visible) and the $\lambda_{50}$ in the ultraviolet range as $\lambda_{50}$ (ultraviolet), $\lambda_{50}$ (ultraviolet) is preferably present within a range of approximately 320 to 360 nm. Within the wavelength range from $\lambda_{50}$ (ultraviolet) to $\lambda_{50}$ (visible), as the wavelength becomes longer, the transmittance first increases monotonically, then decreases monotonically to 50 percent at $\lambda_{50}$ (visible). Within this range, a transmittance of 50 percent or more is exhibited. This is unrelated to the thickness of the glass. At the above-stated thickness, the transmittance at a wavelength of 400 nm is preferably 80 percent or more. As the wavelength becomes longer from $\lambda_{50}$ (visible) to 800 nm, the transmittance decreases monotonically. In the spectral transmittance from wavelengths of 400 to 1,200 nm, the transmittance reaches its lowest level in the range of wavelengths from 800 to 1,000 nm. Although this range is in the near-infrared range, the sensitivity of semiconductor imaging elements is not adequately low and thus it is necessary to suppress the transmittance of filters for color compensating to an adequately low level. Since the sensitivity of semiconductor imaging elements at wavelengths from 1,000 to 1,200 nm is lower than that in the wavelength range below 1,000 nm, the upper limit of transmittance is reduced. Accordingly, so long as the transmittance remains below a prescribed level, it does not matter if the transmittance increases monotonically with wavelength over the wavelength range of 1,000 to 1,200 nm.

A refractive index nd around 1.5 and an Abbé number νd around 74.5 can be obtained in near-infrared light-absorbing glass III.

Due to these transmittance characteristics, a filter employing near-infrared light-absorbing glass III can perform good color compensating in solid-state imaging elements and the like.

Further, the near-infrared light-absorbing glass III has good weatherability as the above-described near-infrared light-absorbing glass I.

(Resistance to Devitrification)

Since the near-infrared light-absorbing glass III is employed in optical filters and the like, it has regulated transmittance characteristics such as those set forth above. However, when crystallization occurs in the glass during the manufacturing process, transmittance characteristics are negatively affected. Accordingly, as set forth in the above description of glass I, resistance to devitrification is an important characteristic to be imparted to near-infrared light-absorbing glass. Resistance to devitrification is evaluated based on the liquid phase temperature. An increase in resistance to devitrification corresponds to a drop in the liquid phase temperature. When the liquid phase temperature increases, the forming temperature must be increased to avoid devitrification in the course of forming glass articles from a melted near-infrared light-absorbing glass. At the same time, there are problems in that forming of the glass becomes difficult, the viscosity of the glass during forming decreases, convection appears in the melted glass being formed into a glass article to cause striae, severe volatization, particularly that of fluorine occurs from the glass to reduce the concentration of fluorine on the glass surface during forming, and thus a refractive index differential is produced, tending to cause the generation of striae on the surface. Further, there are problems in that the surface of the formed glass article is degenerated and volatile substances adhere to and contaminate the mold. Further, when forming thick glass having large dimensions, there are problems in that the inner cooling rate is delayed and devitrification (crystallization) of the glass tends to occur.

In conventional glass, when the Cu amount is increased to impart the above-described transmittance characteristics, the liquid phase temperature is increased, causing the various above-stated problems.

By contrast, when the liquid phase temperature of near-infrared light-absorbing glass III is set equal to or lower than the temperature at which a glass viscosity of 0.5 Pa·s is exhibited, the above-described problems can be eliminated and high-quality near-infrared light-absorbing glass can be obtained. The preferred liquid phase temperature is 690° C. or less. When the liquid phase temperature is within this range, the range over which forming conditions can be selected is broad and high-quality near-infrared light-absorbing glass is readily achieved.

Further, since the glass transition temperature of the near-infrared light-absorbing glass III is 550° C. or less, it is possible to form optical elements such as lenses and refractive gratings by precision press molding (forming with a mold) without mechanical processing such as grinding or polishing of optically functional surfaces following molding.

The method of manufacturing the near-infrared light-absorbing glass formed article of the first aspect of the present invention will be described below.

In the manufacturing method of the formed glass article of the first aspect of the present invention, the formed glass article comprising near-infrared light-absorbing glass III is prepared by forming a melted glass having a temperature less than 700° C. and then cooling it.

(Melting of the Glass)

The glass is melted in the same manner as described in the manufacturing methods of near-infrared light-absorbing glasses I and II above.

(Forming of the Melted Glass)

The glass viscosity of near-infrared light-absorbing glass III at its liquid phase temperature is 0.5 Pa·s or more. Thus, convection of the glass is suppressed in the mold even when the glass is formed at a temperature around the liquid phase temperature. Since the above-described copper-containing fluorophosphate glass is imparted with the above-stated characteristics regardless of high copper concentration, the above-described convection is suppressed and thus the formation of striae can be prevented. Further, since the liquid phase temperature can be made 690° C. or lower, little fluorine volatizes and striae are suppressed on the surface of the glass. Further, the above-stated characteristics yield good resistance to devitrification so that homogeneous glass can be manufactured by forming thick blocks.

Glass articles are formed from near-infrared light-absorbing glass III by flowing out homogenized glass melting. The temperature of the melted glass during flowing out may be set within a range of the liquid phase temperature to 20° C. above the liquid phase temperature. When the melted glass is flowed out, it is cooled to a temperature around the liquid phase temperature to increase the glass viscosity, thereby convention tends not to occur and striae tend not to form in the glass that is flowing out. Glass forming can be conducted at 710° C. or less, preferably at 700° C. or less, more preferably at 680° C. or less, and further preferably at 660° C. or less.

Examples of the method of forming the glass are cast forming by casting the melted glass in a casting mold, a method in which the melted glass is flowed out of a pipe and then desired weight portions are separated to form glass blocks, roll forming, and press molding.

Since near-infrared light-absorbing glass III has good suitability of forming and resistance to devitrification, plate-shaped block with large size can be formed. Thus, when precise slicing technology is combined, large, thin glass sheets with large size can be inexpensively produced.

An example of such forming is given below. A casting mold comprised of a flat and level bottom surface, a pair of mutually parallel opposing side walls on either edge of the bottom surface, and a casting frame blocking one opening positioned between a pair of side walls is prepared. A homogenized glass melted is cast into this casting mold through a platinum alloy pipe at a constant flow rate. The melted glass that is cast spreads out in the coasting mold and is formed into a glass sheet controlled to a fixed width by the pair of side walls. The formed glass sheet is continuously drawn out through the opening of the casting mold. Here, forming conditions such as the shape and dimensions of the casting mold, and the melted glass flow rate can be suitably set to form large, thick glass blocks. In this forming, the thickness of the sheet is determined by the depth of the melted glass in the coasting mold. To obtain a thick sheet, the depth of the melted glass has to be increased. Since the melted glass is continuously supplied through a pipe where the depth of the melted glass is deep, as the low-viscosity melted glass flows in, glass convection, which is the main cause of striae, increases markedly. However, using the near-infrared light-absorbing glass III prevents the glass from devitrify during forming and it causes the glass to flow at relatively high viscosity, preventing the generation of striae due to convection and the like. Accordingly, it is possible to manufacture glass blocks without drawbacks such as striae and devitrification even in thick sheets.

The formed glass article is transferred to an annealing furnace that has been preheated to a temperature around the glass transition temperature and gradually cooled to room temperature. The formed glass article from which strain has been removed by gradual cooling can be precisely sliced, ground, and polished. In these processes, the slicing with high precision of thick glass materials generates fewer shavings than processing formed glass, that has been made thin to some extent, to a thin sheet by grinding and polishing on two surfaces. Therefore, this is less expensive overall, and is thus desirable.

The near-infrared light-absorbing element of the first aspect of the present invention is an optical element comprising near-infrared light-absorbing glass I, II, or III of the first aspect of the present invention as set forth above, and may be in the form of lenses and the thin-sheet glass elements employed in near-infrared light-absorbing filters, for example. These elements are suited to use in the color compensating of solid-state imaging elements. It can be obtained, for example, by the above-described forming methods. Further, it can be obtained by mechanically processing such as cutting, shaving, grinding, or polishing of a formed article obtained by the above-described forming methods. It is also possible to form a preform of glass I, II, or III, after which this preform is softened by heating and press-molded. Particularly, a precision press molding method can be performed, in which a final product is press-molded without any mechanical processing such as grinding or polishing of optically functional surfaces.

Since these near-infrared light-absorbing elements comprise near-infrared light-absorbing glass I, II, or III, it affords good color compensating function even when it is thin, and has good resistance to devitrification and weatherability. The thickness of the near-infrared light-absorbing element (the interval between the surface where passing light enters and the surface where it exits), determined in consideration of the transmittance characteristics of the element, is preferably about 0.1 to 0.8 mm, more preferably 0.3 to 0.6 mm. It is also desirable for $\lambda_{50}$ to fall within a range of 605 to 625 nm, and preferably, to be 615 nm. To obtain such a near-infrared light-absorbing element, it is simply required to adjust the composition of near-infrared light-absorbing glass I, II, or III and process it to a thickness yielding the above-stated characteristics.

An example of the near-infrared light-absorbing filter of the first aspect of the present invention will be described below. The two surfaces of this filter comprise plate-shaped near-infrared light-absorbing elements comprising optically polished near-infrared light-absorbing glass I, II, or III. These elements impart a color compensating function to the filter. On one side of the elements, plate-shaped crystals that have been optically polished on both sides can be adhered. On one side of the crystal, plate-shaped optical glass, such as BK-7, that passes visible light and both surface of which are optically polished, can be adhered. The near-infrared light-absorbing filter may be thus configured, or another plate-shaped optical glass (such as BK-7), that passes visible light and both surface of which are optically polished, may be adhered to other side of the thin plate-shaped optical glass. Optionally, a multilayered optical film may be formed on the surface of the filter.

The filter can be positioned in front of the light-receiving surface of a solid-state imaging element for color compensating of the image that is picked up by the solid-state imaging element. Since near-infrared light-absorbing elements comprising near-infrared light-absorbing glass I, II, or III are employed in this filter, a good color compensating function is imparted and the filter can be rendered thin. Further, since near-infrared light-absorbing elements comprising near-infrared light-absorbing glass I, II, or III with good weatherability are employed, deterioration such as dimming can be prevented even with long-term use.

[The Second Aspect]

The glass of the second aspect of the present invention is copper-containing fluorophosphate glass or phosphate glass absorbing near-infrared light. The glass of the second aspect is characterized in that 0.1 weight percent or more of copper based on CuO, 0.005 to 0.5 weight percent of iron based on $Fe_2O_3$, and 0.01 to 1 weight percent of antimony based on $Sb_2O_3$ are incorporated to impart near-infrared light-absorbing characteristics, and in that no toxic arsenic causing environmental problems is incorporated.

As described above, when low-grade glass starting materials are employed, although the cost of the starting materials is reduced, there is a problem in that transmittance in the visible wavelength range decreases. It is assumed that this is caused by the large amount of impurities contained, but the correlation between impurities and optical characteristics was unclear. Accordingly, the present inventors investigated the correlation between impurities and optical characteristics, resulting in the discovery that the absorption of iron ions causes a reduction in transmittance. That is, the content of iron in the glass obtained from high-grade glass starting materials is less than 0.005 weight percent based on $Fe_2O_3$, while the content of iron when low-grade glass starting materials are employed is 0.005 weight percent or more based on $Fe_2O_3$. The absorption of iron ions was found to reduce transmittance at a wavelength of 400 nm and make it difficult to achieve good color compensating.

Accordingly, the present inventors conducted further intensive research, resulting in the discovery that it was possible to prevent the decrease in transmittance at a wavelength of 400 nm when antimony ions were present in glass containing copper ions and iron ions.

The prevention of the decrease in transmittance is thought to result from a mechanism as follows. The optical characteristics sought in the color compensating of a solid-state imaging element are obtained by the bivalent copper cationic $Cu^{2+}$. That is, $Cu^{2+}$ maintains transmittance in the visible wavelength range while it has an effect of enhancing absorption in the wavelength from the near-infrared range to infrared range. However, when the $Cu^{2+}$ in glass is reduced to monovalent $Cu^+$ cations, absorption at around 400 nm increases, compromising the above-described optical characteristics. However, when both $Fe^{3+}$ iron ions and $Sb_2O_3$ are present in the glass, the $Cu^+$ ions are oxidized by the $Fe^{3+}$ and Sb ions, producing $Cu^{2+}$. When trace amounts of iron and $Sb_2O_3$ are introduced into glass not containing copper, transmittance at a wavelength of 400 nm is reduced due to the absorption of iron ions. However, in copper-containing fluorophosphate glass or copper-containing phosphate glass, since the oxidizing effect of $Cu^+$ is greater than absorption by iron ions on transmittance at a wavelength of 400 nm, the reduction in transmittance is prevented.

To achieve the above effect, 0.1 weight percent or more of copper based on CuO is incorporated into the glass of the second aspect of the present invention. At a copper content based on CuO of less than 0.1 weight percent, adequate near-infrared light-absorption cannot be achieved. Further, the copper content based on CuO is preferably from 0.1 to 4.7 weight percent. At 4.7 weight percent or less, glass that is highly resistant to devitrification can be achieved.

In the glass of the second aspect of the present invention, the iron content based on $Fe_2O_3$ is from 0.05 to 0.5 weight percent, preferably from 0.01 to 0.5 weight percent, and more preferably from 0.01 to 0.1 weight percent. When the iron content based on $Fe_2O_3$ exceeds 0.5 weight percent, visible light transmittance, particularly transmittance at a wavelength of 400 nm, decreases even when antimony is present. Further, when the iron content based on $Fe_2O_3$ is less than 0.005 weight percent, absorption at a wavelength around 400 nm by $Cu^+$ causes decrease of visible light transmittance, particularly transmittance at a wavelength of 400 nm. Further, since glass purified to high purity is required, there is a problem in the form of increased cost. Glass incorporating iron as an impurity is also included in the glass of the second aspect of the present invention. The glass of the second aspect of the present invention includes glasses obtained when iron is actively added to an iron content falling within a range of 0.005 to 0.5 weight percent based on $Fe_2O_3$, copper is incorporated to 0.1 weight percent or more based on CuO, and antimony is incorporated in a quantity of 0.01 to 1 weight percent based on $Sb_2O_3$.

In the glass of the second aspect of the present invention, the antimony content based on $Sb_2O_3$ is from 0.01 to 1 weight percent, preferably from 0.05 to 1 weight percent, and more preferably from 0.01 to 1 weight percent. When the antimony content based on $Sb_2O_3$ is less than 0.01 weight percent, transmittance drops at a wavelength of 400 nm, and when it exceeds 1 weight percent, weatherability and resistance to devitrification decrease.

The glass of the second aspect of the present invention preferably has the following optical characteristics based on a thickness of 0.45 mm.
(1) In the spectral transmittance of wavelengths from 400 to 1,200 nm, the wavelength (referred to hereinafter as $\lambda_{50}$) at which transmittance is 50 percent ranges from 605 to 625 nm.
(2) Transmittance at a wavelength of 400 nm is 80 percent or more. Preferably, transmittance at a wavelength of 400 nm is 84 percent or more.
(3) The transmittance at a wavelength of 1,200 nm is less than 22 percent.

The glass of the second aspect of the present invention can provide a good color compensating function due to a $\lambda_{50}$ ranging from 605 to 625 nm, particularly of 615 nm. In the glass of the second aspect, high transmittance at a wavelength of 400 nm and low transmittance at a wavelength of 1,200 nm as set forth above render the glass useful as near-infrared light-absorbing glass.

The glass of the second aspect of the present invention further preferably has the following optical characteristics.
(4) Transmittance at a wavelength ranging from 800 to 1,000 nm is less than 5 percent.
(5) Spectral transmittance at a wavelength ranging from $\lambda_{50}$ to 1,200 nm is 50 percent or less.
(6) Transmittance at a wavelength ranging from 400 nm to $\lambda_{50}$ is 50 percent or more.

The spectral transmittance of the glass at a wavelength of 400 to 1,200 nm is as follows. As the wavelength increases from 400 nm, transmittance increases monotonically and peaks. Once the maximum region has been exceeded, it decreases monotonically, reaching a minimum at a wavelength ranging from 750 to 1,000 nm. Once transmittance has reached a minimum, transmittance begins anew to increase monotonically, but never reaches 20 percent at a wavelength shorter than 1,200 nm.

The above-stated spectral transmittance and transmittance are the transmittances when a measurement beam is passed through beam entry and exit surfaces that are positioned parallel and optically polished, and they are transmittances (external transmittances) that include light that is lost due to reflection at the entry and exit surfaces.

In the glass, the refractive index nd is around 1.5 and the Abbé number vd is around 75.

The preferred composition of fluorophosphate glass will be described in detail below.

The glass of the second aspect of the present invention preferably comprises, when denoted as cationic percentages,

| | |
|---|---|
| $P^{5+}$ | 11 to 43 percent |
| $Al^{3+}$ | 4 to 16 percent |
| $R_1^+$ | 0.1 to 43 percent |
| (where $R_1^+$ is the total of $Li^+$, $Na^+$, and $K^+$) | |
| $R_2^{2+}$ | 12 to 53 percent |
| (where $R_2^{2+}$ is the total of $Mg^{2+}$, $Ca^{2+}$, $Sr^{2+}$, $Ba^{2+}$, and $Zn^{2+}$) | |
| $Cu^{2+}$ | 1.0 to 4.7 percent, | and $F^-$ and $O^{2-}$ as anionic components. The contents of iron and antimony are as stated above.

The reason why the above-stated glass composition is preferred will be given below. In the description below, the content of cationic components is denoted as a cationic percentage and the content of anionic components is denoted as an anionic percentage. Here, the terms cationic percentage and anionic percentage are values denoted as atomic percentages.

$P^{5+}$ is the basic component of fluorophosphate glass or phosphate glass, and is an important component in imparting absorption in the infrared range. In the glass of the second aspect, the $P^{5+}$ content of less than 11 percent results in deterioration of the color compensating function and tends to result in a green coloration. Conversely, a content exceeding 43 percent tends to compromise weatherability and resistance to devitrification. Accordingly, the $P^{5+}$ content in the glass of the second aspect is preferably from 11 to 43 percent, more preferably from 23 to 41 percent, and further preferably from 25 to 40 percent.

$Al^{3+}$ is an important component of fluorophosphate glass or phosphate glass for enhancing resistance to devitrification. In the glass of the second aspect, when the $Al^{3+}$ content is less than 4 percent, resistance to devitrification tends to decrease, the liquid phase temperature rises, and it tends to become difficult to melt and form high-quality glass. Conversely, when the content exceeds 16 percent, resistance to devitrification tends to deteriorate. Accordingly, the $Al^{3+}$ content in the glass of the second aspect is preferably from 4 to 16 percent, more preferably from 8 to 16 percent.

$R_1^+$ ($Li^+$, $Na^+$, and $K^+$) is a useful component for improving the resistance to devitrification of the glass. In the glass of the second aspect, when the $R_1^+$ content is less than 0.1 percent, the effect achieved is small. Conversely, when the content exceeds 43 percent, durability and processability of the glass tend to deteriorate. Accordingly, the $R_1^+$ content in the glass of the second aspect is preferably from 0.1 to 43 percent, more preferably from 20 to 30 percent. In the glass of the second aspect of the present invention, the $Li^+$ content is prefearbly from 11 to 25 percent and the $Na^+$ content is preferably from 4 to 13 percent.

$R_2^{2+}$ ($Mg^{2+}$, $Ca^{2+}$, $Sr^{2+}$, $Ba^{2+}$, and $Zn^{2+}$) is a useful component for enhancing the resistance to devitrification, durability, and processability of fluorophosphate glass or phosphate glass. In the glass of the second aspect of the present invention, when the total of $R_2^{2+}$ is less than 12 percent, the resistance to devitrification and durability of the glass tend to deteriorate. Conversely, when the content exceeds 53 percent, resistance to devitrification tends to deteriorate. Accordingly, the $R_2^{2+}$ content in the glass of the second aspect is preferably from 12 to 53 percent, more preferably from 15 to 35 percent.

In the glass of the second aspect, the $Mg^{2+}$ content range is preferably from 2 to 6 percent, the $Ca^{2+}$ content range is preferably from 6 to 12 percent, the $Sr^{2+}$ content range is preferably from 4 to 9 percent, the $Ba^{2+}$ content range is preferably from 3 to 8 percent, and the $Zn^{2+}$ content range is preferably greater than 0 percent and 6 percent or less.

In the glass of the second aspect, $Zn^{2+}$ is an optional component, but is preferably incorporated to enhance resistance to devitrification. From this perspective, the $Zn^{2+}$ content range is preferably greater than 0 percent and 6 percent or less, more preferably from 2 to 6 percent.

$Cu^{2+}$ is a component playing an important role in optical absorption characteristics. To achieve adequate absorption in a wavelength from near-infrared range to infrared range in thin glass, the use of 1.0 percent or more is desirable in this composition. To prevent deterioration of resistance to devitrification, a content of 4.7 percent or less is desirable. Accordingly, in the glass of the second aspect, the $Cu^{2+}$ content preferably ranges from 1.0 to 4.7 percent, more preferably from 2.6 to 4.7 percent, and further preferably from 2.8 to 4.7 percent.

$O^{2-}$ is a particularly important anionic component of the glass. When the content is less than 52 percent as an anionic percentage, the bivalent $Cu^{2+}$ tends to be reduced to monovalent $Cu^+$, absorption in the short wavelength range, particularly at a wavelength around 400 nm, tends to increase, and a green coloration tends to develop. Accordingly, the content of $O^{2-}$ in the glass of the second aspect is preferably from 52 to 75 percent, more preferably from 53 to 75 percent.

$F^-$ is an important anionic component for reducing the melting point of the glass and enhancing weatherability. In the glass of the second aspect, when the $F^-$ content is less than 25 percent as an anionic percentage, weatherability tends to deteriorate. Conversely, when it exceeds 48 percent, since the content of the anionic component in the form of $O^{2-}$ that is also present decreases, coloration tends to develop due to monovalent $Cu^+$ at a wavelength around 400 nm. Accordingly, the $F^-$ content in the glass of the second aspect is preferably from 25 to 48 percent, more preferably from 25 to 47 percent.

$Zr^{4+}$, $La^{3+}$, $Gd^{3+}$, $Y^{3+}$, $Si^{4+}$, and $B^{3+}$ may be suitably employed in order to enhance resistance to devitrification, to adjust the glass viscosity, to adjust transmittance, and to clarify. In the glass of the second aspect, at least one cationic component selected from this group may be employed at a total of less than 5 percent, preferably 2 percent or less.

The glass of the second aspect does not contain arsenic. In consideration of the environmental influence, the removal of lead compounds and cadmium compounds is desirable. Radioactive substances such as uranium and thorium should also be removed.

In the manufacturing of the glass of the second aspect, each component is preferably incorporated as a phosphate, fluoride, carbonate, oxide, or the like. Although the use of a nitrate as a starting material of the glass is conceivable, harmful nitrogen compounds are produced during melting; a nitrate dissolves containers for melting, for example, corroding platinum; and a nitrate tends to generate foreign matter in the glass. Accordingly, the use of nitrate starting materials should be suppressed. Thus, it is desirable for the glass of the second aspect not to contain nitrate compounds. Further, glass starting materials essentially not containing arsenic are employed to manufacture the glass of the second aspect.

(Weatherability)

Good weatherability is necessary for the long-term use of near-infrared light-absorbing glass. When weatherability is poor, the surface of the glass clouds and it becomes unsuitable for use in optical filters and the like.

The glass of the second aspect of the present invention has both good transmittance characteristics and weatherability. The weatherability of the glass of the second aspect may be confirmed under the same conditions as employed to evaluate the weatherability of the glass of the first aspect set forth above. No dimming state was observed in the glass of the second aspect of the present invention under the above-stated conditions, and it was confirmed to have good weatherability.

(Resistance to Devitrification)

When crystals develop in near-infrared light-absorbing glass in the manufacturing process, the crystals either block or scatter light, precluding use of the glass in optical filters. Thus, resistance to devitrification is an important characteristic that should be possessed by near-infrared light-absorbing glass. As set forth above, resistance to devitrification can be evaluated by the liquid phase temperature. The method of measuring the liquid phase temperature and the problems accompanying a rise in the liquid phase temperature are as set forth in the first aspect above.

In the fluorophosphate glass or phosphate glass of the second aspect of the present invention, the liquid phase temperature is 750° C. or less, yielding good resistance to devitrification. The liquid phase temperature of the glass of the second aspect is preferably suppressed to 720° C. or below, more preferably to 700° C. or below, further preferably to 690° C. or below, and particularly preferably to 680° C. or below. When the liquid phase temperature falls within the stated range, the range of selection of forming conditions is broad and glass suitable for near-infrared light-absorbing glass can be obtained.

Since the yield point of the fluorophosphate glass or phosphate glass of the second aspect is generally 550° C. or less, it is possible to form optical elements such as lenses and diffraction gratings by precision press molding (forming with a mold) without mechanically processing of optically functioning surfaces such as grinding or polishing following molding.

The viscosity of the glass of the second aspect is preferably 0.5 Pa·s or more at the liquid phase temperature. Such a viscosity characteristic permits forming of high-quality glass without striae and without devitrification of the glass. When the viscosity at the liquid phase temperature is less than 0.5 Pa·s, when forming is conducted under temperature conditions that do not lead to devitrification, convection is generated in the glass during the forming process, tending to form striae.

(Methods of Manufacturing Near-Infrared Light-Absorbing Glass)

An example of a method of manufacturing a fluorophosphate glass of the second aspect of the present invention will be described below. Suitable starting materials in the form of phosphates, fluorides, carbonates, and oxides are weighed out to achieve a desired composition, mixed, and melted in a platinum crucible at 750 to 900° C., preferably at 850° C. or lower. In this process, a cover made of platinum or the like is preferably employed to prevent volatilization of fluorine components. Further, although there is no problem in conducting melting in the atmosphere, it is desirable to either employ an oxygen atmosphere or bubble oxygen in the melted glass to suppress change in the copper valence.

After stirring and clarifying the glass melt, the glass is flowed out and formed. Flowing out the glass after decreasing the temperature to a temperature around the liquid phase temperature to increase the viscosity of the glass tends to prevent convection and the generation of striae in the glass that has flowed out. Any conventional forming method such as casting, flowing through a pipe, rolling, and pressing may be employed to form the glass. The formed glass is transferred to an annealing furnace preheated to a temperature around the glass transition temperature and then gradually cooled to room temperature.

Phosphate glass of the second aspect may also be similarly manufactured by suitably employing starting materials such as phosphates, carbonates, and oxides.

The fluorophosphate glass or phosphate glass of the second aspect is suited to use in solid-state imaging elements such as CCDs and the color compensating filters of semiconductor imaging elements. Since light entering an imaging element (particularly visible light) passes through the glass, the glass is preferably of a homogeneous optical glass grade that does not contain foreign matter or bubbles.

The near-infrared light-absorbing element of the second aspect of the present invention is an optical element comprising fluorophosphate glass or phosphate glass of the second aspect; examples are lenses and thin plate-shaped glass elements employed in near-infrared light-absorbing filters. These elements are suited to use in color compensating in solid-state imaging elements. It can be obtained, for example, by the above-described forming methods. Further, it can be obtained by mechanically processing such as cutting, shaving, grinding, or polishing of a formed article obtained by the above-described forming methods. It is also possible to form a preform of the glass, after which this preform is softened by heating and press-molded. Particularly, a precision press molding method can be performed, in which a final product is press-molded without any mechanical processing such as grinding or polishing of optically functional surfaces.

This near-infrared light-absorbing element is comprised of the glass of the second aspect of the present invention. Thus, it can be provided at a low cost, has good color compensating function even when it is thin, and affords good resistance to devitrification and weatherability. The thickness of the near-infrared light-absorbing element (the interval between the surface where passing light enters and the surface where it exits), determined in consideration of the transmittance characteristics of the element, is preferably about 0.1 to 0.8 mm, more preferably 0.3 to 0.6 mm. It is also desirable for $\lambda_{50}$ to fall within a range of 605 to 625 nm, and preferably, to be 615 nm. To obtain such a near-infrared light-absorbing element, it is simply required to adjust the composition of the near-infrared light-absorbing glass and process it to a thickness yielding the above-stated characteristics.

The near-infrared light-absorbing filter of the second aspect of the present invention is one comprising the near-infrared light-absorbing element of the second aspect. An example of this near-infrared light-absorbing filter will be described below.

The filter comprises near-infrared light-absorbing elements of the second aspect comprising glass of the second aspect both sides of which have been optically polished. These elements impart a color compensating function to the filter. On one side of the elements, plate-shaped crystals that have been optically polished on both sides can be adhered. On one side of the crystal, plate-shaped optical glass, such as BK-7, that passes visible light and both surface of which are optically polished, can be adhered. The near-infrared light-absorbing filter may be thus configured, or another plate-shaped optical glass (such as BK-7), that passes visible light and both surface of which are optically polished, may be adhered to other side of the thin plate-shaped optical glass. Optionally, a multilayered optical film may be formed on the surface of the filter.

The filter can be positioned in front of the light-receiving surface of a solid-state imaging element for color compensating of the image that is picked up by the solid-state imaging element. Since near-infrared light-absorbing elements comprised of the fluorophosphate glass or phosphate glass of the second aspect are employed in this filter, a good color compensating function is imparted and the filter can be rendered thin. Further, since near-infrared light-absorbing elements comprised of the glass with good weatherability are employed, deterioration such as dimming can be prevented even with long-term use, and it is possible to provide at a low cost.

EXAMPLES

The present invention will be described in detail through Examples below. However, the present invention is not limited in any manner by these Examples.

[The First Aspect]

Examples 1 to 12

Glass starting materials in the form of $Al(PO_3)_3$, $AlF_3$, $Li_2CO_3$, NaF, $MgF_2$, $CaF_2$, $SrF_2$, $BaF_2$, $ZnF_2$, $Sb_2O_3$, CuO, and the like were weighed out and mixed so as to achieve the glasses of the compositions shown in Tables 1 and 2. The mixtures were charged to platinum crucibles and covers were positioned. The mixtures were melted at 790° C. to 850° C., stirred, defoamed, and homogenized. Subsequently, they were caused to flow into preheated metal molds and formed to prescribed shapes. The formed glass articles obtained were transferred to an annealing furnace preheated to a temperature around the glass transition temperature and gradually cooled to room temperature. Test pieces were cut from the glass obtained and the various following characteristics were measured.

The spectral transmittance of the glass was obtained by measuring the transmittance of a 0.5 mm thick piece of glass at wavelengths of 200 to 1,200 nm with a spectrophotometer. The transmittances thus obtained were used to calculate the transmittance of each wavelength for a converted thickness where the transmittance at a wavelength of 615 nm become 50 percent.

The coefficient of thermal expansion was measured using an apparatus for thermomechanical analysis as the average coefficient of thermal expansion at 100 to 300° C.

The liquid phase temperature was obtained by charging the glass to a platinum crucible, maintaining the glass at a prescribed temperature for 1 hour in 10° C. increments, and taking the maximum temperature at which the crystals disappeared.

Weatherability was determined by maintaining optically polished glass samples for 1,000 hours in a high-temperature, high-humidity vat at 80° C. and 90 percent relative humidity, visually inspecting the state of dimming on the surface of the glass, and evaluating those samples that did not exhibit dimming as having good weatherability (having weatherability).

Tables 1 through 5 show the composition of the various glasses of Examples 1 to 12; the thickness (thickness at which $\lambda_{50}$=615 nm) at which a transmittance of 50 percent was obtained at a wavelength of 615 nm; transmittance at wavelengths of 400 nm, 600 nm, 800 nm, 900 nm, 1,000 nm, and 1,200 nm for that thickness; transmittance at wavelengths of 400 nm, 600 nm, 800 nm, 900 nm, 1,000 nm, and 1,200 nm at a thickness of 0.5 mm; the liquid phase temperature LT; and the quality of weatherability. All of the Examples had a transmittance at wavelengths of 800 to 1,000 nm of less than 5 percent at the thickness where $\lambda_{50}$=615 nm. Further, the spectral transmittance at wavelengths of 400 to 1,200 was nearly identical to what is shown in FIG. 1.

From the above, it was determined that the fluorophosphate glass of the first aspect of the present invention was thin, afforded improved coloration, had weatherability, and had good resistance to devitrification.

The glass transition temperature of each of the glasses obtained was around 360° C. and the yield point was around 400° C.

Comparative Examples 1 and 2

Two types of glass having compositions outside the ranges of glass I were melted, stirred, defoamed, homogenized, and then formed into prescribed shape in the same manner as in the above-described Examples. The formed glass articles obtained were transferred to an annealing furnace preheated to a temperature around the glass transition temperature and then gradually cooled to room temperature. Test pieces were cut for evaluation from the glasses obtained. Tables 1 to 5 show the compositions of the two types of glass of Comparative Examples 1 and 2 and their evaluation results. As is clear from the Tables, neither of the Comparative Examples achieved the desired transmittance characteristics and both had high liquid phase temperatures of 800° C. or above.

TABLE 1

| | | Composition Cationic component (cationic %) | | | | | | | |
|---|---|---|---|---|---|---|---|---|---|
| | | $P^{5+}$ | $Al^{3+}$ | $Li^+$ | $Na^+$ | $Mg^{2+}$ | $Ca^{2+}$ | $Sr^{2+}$ | $Ba^{2+}$ |
| Example | 1 | 24.26 | 8.09 | 21.68 | 7.72 | 5.66 | 11.99 | 8.75 | 7.48 |
| | 2 | 39.04 | 15.57 | 11.97 | 6.93 | 3.72 | 7.82 | 5.70 | 4.87 |
| | 3 | 30.32 | 4.26 | 39.54 | 5.37 | 2.87 | 6.05 | 4.41 | 3.77 |
| | 4 | 35.32 | 11.76 | 19.27 | 5.66 | 4.02 | 8.53 | 6.23 | 5.33 |
| | 5 | 28.20 | 9.40 | 20.29 | 12.99 | 4.19 | 8.85 | 6.47 | 5.53 |
| | 6 | 36.74 | 10.10 | 19.84 | 7.05 | 4.09 | 8.67 | 6.33 | 3.20 |
| | 7 | 28.34 | 11.38 | 23.51 | 7.48 | 4.01 | 8.44 | 6.16 | 5.28 |
| | 8 | 28.82 | 11.20 | 23.14 | 7.36 | 3.94 | 8.31 | 6.06 | 5.20 |
| | 9 | 28.82 | 13.94 | 23.26 | 7.40 | 3.06 | 6.46 | 4.70 | 4.03 |
| | 10 | 28.19 | 11.32 | 23.36 | 4.75 | 3.97 | 8.39 | 6.11 | 5.23 |
| | 11 | 28.21 | 14.00 | 23.33 | 7.43 | 4.00 | 8.37 | 6.11 | 5.23 |
| | 12 | 27.83 | 13.79 | 23.02 | 7.32 | 3.93 | 8.26 | 6.04 | 5.16 |
| Comp. Ex. | 1 | 40.46 | 0.03 | 20.50 | 0.00 | 14.50 | 7.54 | 5.50 | 10.38 |
| | 2 | 38.54 | 10.59 | 20.83 | 0.00 | 4.29 | 9.08 | 9.11 | 3.38 |

TABLE 2

| | | Composition | | | | | | | |
|---|---|---|---|---|---|---|---|---|---|
| | | Cationic component (cationic %) | | | | | Anionic component (anionic %) | | |
| | | $Zn^{2+}$ | $R^{2+}$ | $Cu^{2+}$ | $Sb^{3+}$ | Total of cation | $F^-$ | $O^{2-}$ | Total of anion |
| Example | 1 | 0.00 | 33.88 | 4.37 | 0.00 | 100.00 | 46.20 | 53.80 | 100.00 |
| | 2 | 0.00 | 22.11 | 4.38 | 0.00 | 100.00 | 31.55 | 68.45 | 100.00 |
| | 3 | 0.00 | 17.10 | 3.41 | 0.00 | 100.00 | 27.32 | 72.68 | 100.00 |
| | 4 | 0.00 | 24.11 | 3.88 | 0.00 | 100.00 | 31.06 | 68.94 | 100.00 |
| | 5 | 0.00 | 25.04 | 4.08 | 0.00 | 100.00 | 38.96 | 61.04 | 100.00 |
| | 6 | 0.00 | 22.29 | 3.98 | 0.00 | 100.00 | 26.73 | 73.27 | 100.00 |
| | 7 | 2.06 | 25.95 | 3.34 | 0.00 | 100.00 | 39.91 | 60.09 | 100.00 |
| | 8 | 2.67 | 26.17 | 3.29 | 0.00 | 100.00 | 39.91 | 60.09 | 100.00 |
| | 9 | 5.34 | 23.60 | 2.96 | 0.01 | 100.00 | 40.94 | 59.06 | 100.00 |
| | 10 | 5.36 | 29.07 | 3.33 | 0.00 | 100.00 | 40.87 | 59.13 | 100.00 |
| | 11 | 0.00 | 23.71 | 3.33 | 0.00 | 100.00 | 40.77 | 59.23 | 100.00 |
| | 12 | 0.00 | 23.39 | 4.65 | 0.00 | 100.00 | 40.44 | 59.56 | 100.00 |
| Comp. Ex. | 1 | 0.00 | 37.92 | 1.09 | 0.00 | 100.00 | 19.80 | 80.20 | 100.00 |
| | 2 | 0.00 | 25.86 | 4.18 | 0.00 | 100.00 | 25.69 | 74.31 | 100.00 |

TABLE 3

| | | | Transmittance characteristics | | | | | |
|---|---|---|---|---|---|---|---|---|
| | | $\lambda_{50}$ at a thickness of 0.5 mm (nm) | Transmittance at a thickness of 0.5 mm | | | | | |
| | | | Transmittance at a wavelength of 400 nm (%) | Transmittance at a wavelength of 600 nm (%) | Transmittance at a wavelength of 800 nm (%) | Transmittance at a wavelength of 900 nm (%) | Transmittance at a wavelength of 1000 nm (%) | Transmittance at a wavelength of 1200 nm (%) |
| Example | 1 | 591 | 80.2 | 42.2 | 0.2 | 0.2 | 0.4 | 5.8 |
| | 2 | 602 | 84.1 | 50.2 | 0.2 | 0.2 | 0.3 | 6.1 |
| | 3 | 605 | 86.0 | 53.2 | 0.2 | 0.2 | 0.4 | 5.1 |
| | 4 | 604 | 85.2 | 53.2 | 0.2 | 0.2 | 0.8 | 5.9 |
| | 5 | 598 | 83.8 | 49.6 | 0.2 | 0.2 | 0.4 | 7.2 |
| | 6 | 603 | 85.2 | 50.2 | 0.2 | 0.2 | 0.2 | 6.1 |
| | 7 | 609 | 84.2 | 55.5 | 0.2 | 0.2 | 1.0 | 14.2 |
| | 8 | 615 | 85.2 | 58.2 | 0.2 | 0.2 | 1.2 | 10.2 |
| | 9 | 615 | 85.2 | 57.8 | 0.2 | 0.2 | 1.4 | 11.2 |
| | 10 | 615 | 82.5 | 58.3 | 0.4 | 0.6 | 1.5 | 13.2 |
| | 11 | 608 | 86.2 | 53.2 | 0.2 | 0.2 | 1.2 | 11.8 |
| | 12 | 592 | 80.4 | 48.2 | 0.1 | 0.1 | 0.2 | 5.9 |
| Comp. Ex. | 1 | 580 | 77.8 | 46.8 | 0.3 | 0.3 | 0.3 | 7.8 |
| | 2 | 574 | 58.0 | 37.0 | 0.3 | 0.3 | 0.3 | 4.4 |

TABLE 4

| | | Thickness of $\lambda_{50}$ = 615 nm (nm) | Transmittance characteristics | | | | | |
|---|---|---|---|---|---|---|---|---|
| | | | Transmittance at a thickness of $\lambda_{50}$ = 615 nm | | | | | |
| | | | Transmittance at a wavelength of 400 nm (%) | Transmittance at a wavelength of 600 nm (%) | Transmittance at a wavelength of 800 nm (%) | Transmittance at a wavelength of 900 nm (%) | Transmittance at a wavelength of 1000 nm (%) | Transmittance at a wavelength of 1200 nm (%) |
| Example | 1 | 0.33 | 84.8 | 57.4 | 0.2 | 0.2 | 0.2 | 17.0 |
| | 2 | 0.42 | 84.9 | 57.1 | 0.2 | 0.2 | 0.4 | 11.5 |
| | 3 | 0.45 | 87.0 | 57.1 | 0.2 | 0.2 | 0.5 | 9.9 |
| | 4 | 0.44 | 82.2 | 57.5 | 0.2 | 0.2 | 1.1 | 11.8 |
| | 5 | 0.42 | 85.5 | 57.0 | 0.2 | 0.2 | 0.2 | 12.4 |
| | 6 | 0.44 | 86.3 | 57.6 | 0.2 | 0.2 | 0.2 | 10.2 |
| | 7 | 0.42 | 86.2 | 57.1 | 0.2 | 0.2 | 1.2 | 14.2 |
| | 8 | 0.50 | 85.2 | 58.2 | 0.2 | 0.2 | 1.2 | 10.2 |
| | 9 | 0.50 | 84.8 | 57.8 | 0.2 | 0.2 | 1.4 | 11.2 |
| | 10 | 0.50 | 82.5 | 58.3 | 0.2 | 0.2 | 1.5 | 13.2 |
| | 11 | 0.44 | 86.8 | 57.0 | 0.2 | 0.2 | 1.8 | 15.1 |
| | 12 | 0.34 | 84.8 | 56.0 | 0.3 | 0.3 | 0.3 | 19.4 |
| Comp. Ex. | 1 | 0.38 | 83.9 | 59.8 | 0.3 | 0.3 | 0.3 | 22.4 |
| | 2 | 0.20 | 70.1 | 60.6 | 0.3 | 0.3 | 0.3 | 29.0 |

TABLE 5

| | Liquid phase temperature LT (° C.) | Weatherability |
|---|---|---|
| Example | | |
| 1 | 750 | No dimming |
| 2 | 750 | No dimming |
| 3 | 750 | No dimming |
| 4 | 750 | No dimming |
| 5 | 750 | No dimming |
| 6 | 750 | No dimming |
| 7 | 670 | No dimming |
| 8 | 650 | No dimming |
| 9 | 630 | No dimming |
| 10 | 670 | No dimming |
| 11 | 690 | No dimming |
| 12 | 720 | No dimming |
| Comp. Ex. | | |
| 1 | 830 | No dimming |
| 2 | 920 | No dimming |

Example 13

In the same manner as in Examples 1 to 12, glass was melted, clarified, homogenized, and poured into a casting mold to form sheets of glass having the same composition as Examples 1 to 12. These glass sheets were sliced and both surfaces were optically polished to achieve a thin sheet of desired thickness. This thin sheet was diced to obtain near-infrared light-absorbing elements of desired size and of the above-described thickness. The thickness of the elements was adjusted to exhibit a transmittance of 50 percent at a wavelength of 615±10 nm, and the size thereof was adjusted to 10 mm×10 mm to 30 mm×30 mm. Next, crystal processed into plates and thin plate glass in the form of two sheets of optical glass (BK-7) were prepared, and both sides of each were optically polished. The near-infrared light-absorbing element, crystal, and two BK-7 thin glass sheets were stacked in that order and the thin sheets were bonded together at their optically polished surfaces. An optical multilayer film was then positioned on the outermost surface to complete a near-infrared light-absorbing filter. This filter was positioned in front of the light-receiving surface side of a solid-state imaging element and the image that was picked up was observed, revealing good color compensating.

Example 14

In the same manner as in Examples 1 to 12, glass was melted, clarified, and homogenized to obtain a glass melt which was caused to flow through a platinum nozzle. The glass melt was received by a receiving mold in suitable quantity and formed into spherical glass preforms. Once the formed preforms had been cooled to room temperature, they were reheated and softened in a non-oxidizing atmosphere in the form of nitrogen or a mixed gas of nitrogen and hydrogen and pressed in a pressing mold. The molding surfaces of the pressing mold were first precision processed into a shape that is reverse to the desired optical element, and the molding surface was then precisely transferred to the glass in the pressing step. After having been cooled in the pressing mold to a temperature at which the glass did not deform, the press formed optical elements were removed from the mold and annealed. This yielded optical elements such as aspherical lenses and diffraction gratings. Further, it was possible to make an element having a diffraction grating on the outer surface of a lens by precision press molding.

Examples 15 to 19

In the same manner as in Examples 1 to 12, glass starting materials were melted, stirred, defoamed, and homogenized, after which they were formed into prescribed shapes. The formed glass articles obtained were transferred to an annealing furnace preheated at a temperature around the glass transition temperature and gradually cooled to room temperature. Test pieces were cut from the glass obtained for evaluation.

Tables 6 to 9 give the composition; viscosity at liquid phase temperature; liquid phase temperature; level of weatherability; thickness at which transmittance at 615 nm become 50 percent (thickness where $\lambda_{50}$=615 nm); transmittance of wavelengths of 400 nm, 600 nm, and 1,200 nm at that thickness; and transmittance of wavelengths of 400 nm, 600 nm, and 1,200 nm at a thickness of 0.5 mm for each of the glasses of Examples 15 to 19. All of the Examples had a $\lambda_{50}$ (t=0.5 mm) of less than 630 nm and spectral transmittances at wavelengths of 400 to 1,200 nm that were nearly identical to those shown in FIG. 1.

Further, the liquid phase temperatures were all 690° C. or less and the viscosities at the liquid phase temperature were all 0.5 Pa·s or more.

On this basis, it was determined that the fluorophosphate glass of the first aspect of the present invention had sufficient absorbing property of near-infrared light, good weatherability, and good resistance to devitrification even with a thin thickness, as well as had a viscosity at liquid phase temperature of 0.5 Pa·s or more, and good forming properties.

Comparative Examples 3 and 4

Two types of glass with a viscosity at the liquid phase temperature of less than 0.5 Pa·s were melted, stirred, defoamed, homogenized, and then formed to a prescribed shape in the same manner as in Examples 15 to 19. The formed glass articles obtained were transferred to an annealing furnace preheated to a temperature around the glass transition temperature and gradually cooled to room temperature. Test pieces were cut for evaluation from the glasses obtained. The composition and evaluation results of each of the two glasses of Comparative Examples 3 and 4 are given in Tables 6 to 9. As is clear from these tables, neither of the glasses of these Comparative Examples yielded the desired transmittance characteristics and both had liquid phase temperatures of 800° C. or more.

TABLE 6

| | | Composition Cationic component(cationic %) | | | | | | | |
|---|---|---|---|---|---|---|---|---|---|
| | | $P^{5+}$ | $Al^{3+}$ | $Li^+$ | $Na^+$ | $Mg^{2+}$ | $Ca^{2+}$ | $Sr^{2+}$ | $Ba^{2+}$ |
| Example | 15 | 28.34 | 11.38 | 23.51 | 7.48 | 4.01 | 8.44 | 6.16 | 5.28 |
| | 16 | 28.82 | 11.20 | 23.14 | 7.36 | 3.94 | 8.31 | 6.06 | 5.20 |
| | 17 | 28.82 | 13.94 | 23.26 | 7.40 | 3.07 | 6.46 | 4.70 | 4.03 |
| | 18 | 28.19 | 11.32 | 23.36 | 4.75 | 3.97 | 8.39 | 6.11 | 5.23 |
| | 19 | 28.21 | 14.00 | 23.33 | 7.43 | 4.00 | 8.37 | 6.11 | 5.23 |
| Comp. Ex. | 3 | 41.41 | 0.03 | 20.34 | 0.00 | 14.20 | 7.34 | 5.50 | 10.09 |
| | 4 | 38.54 | 10.59 | 20.83 | 0.00 | 4.29 | 9.08 | 9.11 | 3.38 |

TABLE 7

| | | Composition | | | | | | |
|---|---|---|---|---|---|---|---|---|
| | | Cationic component (cationic %) | | | | Anionic component (anionic %) | | |
| | | $Zn^{2+}$ | $R^{2+}$ | $Cu^{2+}$ | Total of cation | $F^-$ | $O^{2-}$ | Total of anion |
| Example | 15 | 2.06 | 25.95 | 3.34 | 100.00 | 39.91 | 60.09 | 100.00 |
| | 16 | 2.67 | 26.17 | 3.29 | 100.00 | 39.91 | 60.09 | 100.00 |
| | 17 | 5.34 | 23.61 | 2.96 | 100.00 | 40.94 | 59.06 | 100.00 |
| | 18 | 5.36 | 29.07 | 3.33 | 100.00 | 40.87 | 59.13 | 100.00 |
| | 19 | 0.00 | 23.71 | 3.33 | 100.00 | 40.77 | 59.23 | 100.00 |
| Comp. Ex. | 3 | 0.00 | 37.13 | 1.09 | 100.00 | 19.78 | 80.22 | 100.00 |
| | 4 | 0.00 | 25.86 | 4.18 | 100.00 | 25.69 | 74.31 | 100.00 |

| | Viscosity at liquid phase temperature (Pa·s) | Liquid phase temperature LT (° C.) | Weatherability |
|---|---|---|---|
| Example | | | |
| 15 | 0.65 | 670 | No dimming |
| 16 | 0.88 | 670 | No dimming |
| 17 | 1.83 | 670 | No dimming |
| 18 | 0.65 | 670 | No dimming |
| 19 | 0.52 | 690 | No dimming |
| Comp. Ex. | | | |
| 3 | 0.10 | 830 | No dimming |
| 4 | 0.05 | 920 | No dimming |

TABLE 9

| | | | Transmittance characteristics | | | | | | |
|---|---|---|---|---|---|---|---|---|---|
| | | Thickness | Transmittance at a thickness of $\lambda_{50}$ = 615 nm | | | $\lambda_{50}$ | Transmittance at the thickness of $\lambda_{50}$ = 615 nm | | |
| | | ($\lambda_{50}$ = 615 nm) (nm) | Transmittance at a wavelength of 400 nm (%) | Transmittance at a wavelength of 600 nm (%) | Transmittance at a wavelength of 1200 nm (%) | at a thickness of 0.5 mm (nm) | Transmittance at a wavelength of 400 nm (%) | Transmittance at a wavelength of 600 nm (%) | Transmittance at a wavelength of 1200 nm (%) |
| Example | 15 | 0.49 | 85.5 | 58.8 | 18.7 | 609 | 84.2 | 55.5 | 14.2 |
| | 16 | 0.50 | 85.2 | 58.2 | 10.2 | 613 | 85.2 | 58.2 | 10.2 |
| | 17 | 0.50 | 84.8 | 57.8 | 11.2 | 613 | 84.8 | 57.8 | 11.2 |
| | 18 | 0.50 | 82.5 | 58.3 | 13.2 | 613 | 82.5 | 58.3 | 13.2 |
| | 19 | 0.48 | 88.1 | 57.0 | 16.3 | 608 | 86.2 | 53.2 | 11.8 |
| Comp. Ex. | 3 | — | — | — | — | 590 | 77.8 | 46.8 | 5.2 |
| | 4 | — | — | — | — | 592 | 58.0 | 37.0 | 4.4 |

Example 20

Melting Glass that was the same as those used for near-infrared light-absorbing glasses in Examples 16 to 19, and that had been clarified and homogenized was caused to flow continuously into a casting mold at a constant flow rate through a platinum alloy pipe at 670° C. to 710° C. and formed into glass sheets of prescribed thickness and width. The formed glass sheet was drawn at constant speed through an opening on the side of the casting mold, transferred to an annealing furnace, and gradually cooled. Observation of the plate-shaped formed glass article revealed no devitrification or striae, confirming that a high-quality formed article had been obtained.

The formed glass article that had been gradually cooled was cut and processed into a thin sheet and both sides were optically polished to obtain a near-infrared light-absorbing element with a thickness of around 0.5 mm at which transmittance was 50 percent at a wavelength of 615±10 nm. Next, crystal processed into plate-shaped form and two thin sheets of glass comprised of BK-7 were prepared. Both sides were then optically polished. The near-infrared light-absorbing elements, crystal, and two thin sheets of BK-7 glass were then stacked in that order and the thin sheets were bonded by their optically polished surfaces, and a multilayered optical film was positioned on the outermost layer to obtain a near-infrared light-absorbing filter. This filter was positioned in front of the light-receiving side of a solid-state imaging element and the image that was picked up was observed, revealing good color compensating.

Comparative Example 5

The melting glass that was the same as those used for the glasses of Comparative Examples 3 and 4 was caused to flow into a casting mold in the same manner as in Example 20 at 830 to 930° C., and a formed glass articles was obtained. Although forming was conducted while taking care to prevent devitrification of the glass, striae, which seem to be caused by convection of the glass during forming, were observed in the formed glass article.

[The Second Aspect]

Examples 21 and 22

$Fe_2O_3$ and $Sb_2O_3$ were added to high-purity glass starting materials in the form of $Al(PO_3)_3$, $AlF_3$, $Li_2CO_3$, NaF, $MgF_2$, $CaF_2$, $SrF_2$, $BaF_2$, $ZnF_2$, CuO, and the like and the mixture was employed as a glass starting material. The glass compositions of Examples 21 and 22 are shown in Table 10.

This glass starting material was charged to a platinum crucible and a cover was positioned. The mixture was melted at 790° C. to 850° C., stirred, defoamed, and homogenized. Subsequently, it was caused to flow into a preheated metal mold and formed to a prescribed shape. The formed glass article obtained was transferred to an annealing furnace preheated to a temperature around the glass transition temperature, and gradually cooled to room temperature.

In the present Examples, in order to confirm the change in transmittance due to the $Fe_2O_3$ content, high-purity glass starting materials were employed, the quantities of impurities present were strictly controlled, and weighed out $Fe_2O_3$ was uniformly mixed into the glass starting materials.

Test pieces were cut from the glasses obtained and the various following measurements were made.

The spectral transmittance of the glass was obtained by measuring the transmittance of a 0.45 mm thick piece of glass at wavelengths of 300 to 1,200 nm with a spectrophotometer.

The liquid phase temperature was obtained by the same method as employed in the Examples of the first aspect.

The results of measurement of the transmittance at wavelengths of 400 nm and 1,200 nm, $\lambda_{50}$, and liquid phase temperatures are given in Table 10. Both Examples 21 and 22 had transmittances of 84 percent or more at a wavelength of 400 nm.

The weatherability of the glasses of Examples 21 and 22 was then evaluated by the same methods as in the Examples of the first aspect. No dimming was observed in either Example 21 or 22, and they both had good weatherability.

Even when a glass starting material containing more than 0.005 weight percent of iron as an impurity was employed, the incorporation of a prescribed quantity of $Sb_2O_3$ yielded the same results as in the present Examples. In that case, it was possible to greatly reduce the cost of the starting materials relative to when glass starting materials in which the quantities of all impurities were strictly limited were employed.

Comparative Example 6

With the exception that no $Sb_2O_3$ was added, glass was melted and formed in the same manner as in Example 22, and the transmittance, $\lambda_{50}$, liquid phase temperature, and weatherability of the glass were evaluated. Although the evaluation results of the liquid phase temperature and weatherability were identical to those of the stated example, the transmittance at a wavelength of 400 nm at a thickness of 0.45 nm was less than 80 percent, as shown in Table 10.

TABLE 10

| | Quantity added (weight percent) | | Composition of glass starting material (Cationic %) | | | | | | | | | | |
|---|---|---|---|---|---|---|---|---|---|---|---|---|---|
| | $Fe_2O_3$ | $Sb_2O_3$ | $Fe^{n+}$ | $Sb^{n'+}$ | $P^{5+}$ | $Al^{3+}$ | $Li^+$ | $Na^+$ | $R_1^+$ | $Mg^{2+}$ | $Ca^{2+}$ | $Sr^{2+}$ | $Ba^{2+}$ |
| Ex. 21 | 0.01 | 0.2 | 0.01 | 0.1 | 28.04 | 13.94 | 23.26 | 7.40 | 30.66 | 3.07 | 6.46 | 4.70 | 4.03 |
| Ex. 22 | 0.05 | 0.2 | 0.04 | 0.1 | 28.04 | 13.94 | 23.26 | 7.40 | 30.66 | 3.07 | 6.46 | 4.70 | 4.03 |
| Comp. Ex. 6 | 0.05 | 0 | 0.04 | 0 | 28.04 | 13.94 | 23.26 | 7.40 | 30.66 | 3.07 | 6.46 | 4.70 | 4.03 |

TABLE 10-continued

| | Composition of glass starting material (Cationic %) | | | Quantity added (weight percent) Composition of glass starting material (Weight percent) | Composition of glass starting material (Cationic %) (Anionic percent) | | Transmittance (%) | | $\lambda_{50}$ | Liquid phase temperature |
|---|---|---|---|---|---|---|---|---|---|---|
| | $Zn^{2+}$ | $R_2^{2+}$ | $Cu^{n''+}$ | CuO | F | O | $\lambda_{400\,nm}$ | $\lambda_{1200\,nm}$ | (nm) | (° C.) |
| Ex. 21 | 5.34 | 23.61 | 3.74 | 3.8 | 40.94 | 59.06 | 84.5 | 18.3 | 611 | 640 |
| Ex. 22 | 5.34 | 23.61 | 3.74 | 3.8 | 40.94 | 59.06 | 85.8 | 16.4 | 608 | 640 |
| Comp. Ex. 6 | 5.34 | 23.61 | 3.74 | 3.8 | 40.94 | 59.06 | 79 | 21.4 | 614 | 640 |

Note 1)
Each of $n^+$, $n'^+$, $n''^+$ is a valence of each cation which may be taken in glass.
Note 2)
$R_1^+$ is a total amount of $Li^+$ and $Na^+$.
Note 3)
$R_2^{2+}$ is a total amount of $Mg^{2+}$, $Ca^{2+}$, $Sr^{2+}$, $Ba^{2+}$ and $Zn^{2+}$.

Example 23

A 0.2 percent quantity of $Sb_2O_3$ was added to a glass starting material which had been prepared without strictly limiting the quantity of impurities. The glass was melted, clarified, homogenized, and caused to flow into a casting mold in the same manner as in Examples 21 and 22 and a glass sheet comprised of glass of the same composition as in Example 22 was formed. The glass sheet was sliced and optically polished on both sides to obtain a thin sheet of prescribed thickness. This thin sheet was diced to obtain a near-infrared light-absorbing element of prescribed size having the above-stated thickness. The thickness of this element was 0.45 mm and the size thereof is 10 mm×10 mm to 30 mm×30 mm. Next, crystal that had been processed into plate-shaped form and two thin sheets of glass comprised of optical glass (BK-7) were prepared and optically polished on both sides. The near-infrared light-absorbing element, crystal, and two BK-7 thin glass sheets were stacked in that order, the thin sheets were bonded by their optically polished surfaces, and a multilayered optical film was positioned on the outermost layer to prepare a near-infrared light-absorbing filter. This filter was positioned in front of the light-receiving surface of a solid-state imaging element and the image that was picked up was observed, revealing good color compensating.

As described above, it was possible to provide a near-infrared light-absorbing element capable of good color compensating and a near-infrared light-absorbing filter even when using glass starting materials in which the quantities of impurities had not been strictly limited. Since the starting materials of the fluorophosphate glass employed in this near-infrared light-absorbing element and near-infrared light-absorbing filter are inexpensive, they can be provided at low cost.

Comparative Example 7

A near-infrared light-absorbing filter was prepared by the same method as in Example 23 using the glass of Comparative Example 6. This filter was positioned in front of the light-receiving surface of a solid-state imaging element and the image that was picked up was observed. As a result, the image had a somewhat bluish tone, revealing that the color was not adequately compensated.

Example 24

In the same manner as in Examples 21 and 22, glass was melted, clarified, and homogenized to obtain a glass melt, which is then caused to flow through a platinum nozzle. Suitable quantities of the glass melt were received in a receiving mold and spherical glass preforms were formed. Once the formed glass preforms had been cooled to room temperature, they were reheated in a non-oxidizing atmosphere such as nitrogen or a mixed gas of nitrogen and hydrogen, softened, and pressed in a pressing mold. The molding surfaces of the pressing mold were precision processed to the reverse shape of the desired optical element in advance, and during the pressing step, the molding surface was precisely transferred to the glass. After cooling the glass in the pressing mold to a temperature where it would not deform, the press molded optical element was removed from the pressing mold and annealed. This yielded optical elements such as aspherical lenses and diffraction gratings.

Although these optical elements were obtained at low cost, they afforded good color compensating.

The present invention provides near-infrared light-absorbing glass having good weatherability, forming properties, and resistance to devitrification, the thickness of which can be reduced while maintaining good color compensating characteristics without incorporating harmful arsenic. Further, the present invention provides near-infrared light-absorbing elements and near-infrared light-absorbing filters having good weatherability and resistance to devitrification, it being possible to reduce the thickness of the filter while maintaining good color compensating characteristics without adding harmful arsenic.

Still further, the present invention provides a method of manufacturing high-quality formed glass articles comprising the above-described near-infrared light-absorbing glass with good forming properties.

Still further, the present invention provides near-infrared light-absorbing glass, near-infrared light-absorbing elements, and near-infrared light-absorbing filters having good color compensating characteristics at low cost and without incorporating harmful arsenic. Thus, it is possible to provide stably and disseminate color compensating glass for solid-state imaging element, the demand for which is now rapidly increasing.

The present disclosure relates to the subject matters contained in Japanese Patent Application No. 2002-196785 filed on Jul. 5, 2002, Japanese Patent Application No. 2002-238065 filed on Aug. 19, 2002, and Japanese Patent Application No. 2002-302052 filed on Oct. 16, 2002, which are expressly incorporated herein by reference in its entirety.

What is claimed is:

1. Near-infrared light-absorbing glass comprising, denoted as cationic percentages, 23 to 41 percent of $P^{5+}$, 4 to 16 percent of $Al^{3+}$, 11 to 40 percent of $Li^+$, 3 to 13 percent of $Na^+$, 12 to 53 percent of $R^{2+}$ (where $R^{2+}$ denotes the total of $Mg^{2+}$, $Ca^{2+}$, $Sr^{2+}$, $Ba^{2+}$, and $Zn^{2+}$), 0 to 6 percent of $Zn^{2+}$ and 2.6 to 4.7 percent of $Cu^{2+}$, and $F^-$ and $O^{2-}$ as anionic components:
   wherein the glass is fluorophosphates glass essentially comprising no arsenic and no lead.

2. The near-infrared light-absorbing glass according to claim 1, wherein the glass comprises $Zn^{2+}$ as a cationic component.

3. The near infrared light-absorbing glass according to claim 1, wherein the glass comprises, denoted as anionic percentages, 25 to 48 percent of $F^-$ and 52 to 75 percent of $O^{2-}$.

4. The near-infrared light-absorbing glass according to claim 1, wherein the glass has a liquid phase temperature of 750° C. or less.

5. A near-infrared light-absorbing element comprised of the near-infrared light-absorbing glass according to claim 1.

6. A near-infrared light-absorbing filter comprising a glass plate comprised of the near-infrared light-absorbing glass according to claim 1.

7. Near-infrared light-absorbing glass wherein,
   a thickness of the glass, at which the glass exhibits a property that wavelength at which a 50 percent transmittance is exhibited is 615 nm, is in a range of from 0.1 to 0.8 mm,
   a transmittance at a wavelength of 400 nm is 80 percent or more at the thickness at which the glass exhibits said property,
   a transmittance at a wavelength of 800 to 1000 nm is less than 5 percent, a the thickness at which the glass exhibits said property,
   a transmittance at a wavelength of 1200 nm is less than 20 percent at the thickness at which the glass exhibits said property, and
   the glass is fluorophosphates glass essentially comprising no arsenic and no lead and having a content of $Zn^{2+}$ equal to or less than 6 cation percent.

8. The near-infrared light-absorbing glass according to claim 7, wherein the glass has a liquid phase temperature of 750° C. or less.

9. The near-infrared light-absorbing glass according to claim 7 which is copper-containing fluorophosphate glass.

10. A near-infrared light-absorbing element comprised of the near-infrared light-absorbing glass according to claim 7.

11. A near-infrared light-absorbing filter comprising a glass plate comprised of the near-infrared light-absorbing glass according to claim 7.

12. Near-infrared light-absorbing glass, wherein the glass exhibits properties, based on a thickness of 0.5 mm,
   that a first wavelength, at which a 50 percent transmittance is exhibited, is shorter than 630 nm,
   transmittance at a second wavelength of said first wavelength to 700 nm is less than 50 percent,
   transmittance at a third wavelength of 400 nm to said first wavelength is higher than 50 percent,
   the viscosity at a liquid phase temperature is 0.5 Pa·multidot·s or more, and
   the glass is copper-containing fluorophosphates glass essentially comprising no arsenic and no lead and having a content of $Zn^{2+}$ equal to or less than 6 cation percent.

13. A near-infrared light-absorbing element comprised of the near-infrared light-absorbing glass according to claim 12.

14. A near-infrared light-absorbing filter comprising a glass plate comprised of the near-infrared light-absorbing glass according to claim 12.

15. A method of manufacturing a near-infrared light-absorbing formed glass article, wherein melted glass having a temperature of 710° C. or less is formed and cooled to manufacture a formed glass article comprised of the near-infrared light-absorbing glass according to claim 12.

16. Copper-containing glass comprised of fluorophosphate glass or phosphate glass comprising 0.1 weight percent or more of copper based on CuO, 0.005 to 0.5 weight percent of iron based on $Fe_2O_3$, 0.01 to 1 weight percent of antimony based on $Sb_2O_3$, and no arsenic.

17. The copper-containing glass according to claim 16, wherein the glass exhibits properties, in the spectral transmittance of wavelengths of 400 to 1,200 nm, based on a thickness of 0.45 nm,
   that wavelength ($\lambda_{50}$), at which a 50 percent transmittance is exhibited, ranges from 605 to 625 nm,
   transmittance at a wavelength of 400 nm is 80 percent or more, and
   transmittance at a wavelength of 1200 nm is less than 22 percent.

18. The copper-containing glass according to claim 16, wherein the glass comprises, denoted as cationic percentages,

| | |
|---|---|
| $P^{5+}$ | 11 to 43 percent |
| $Al^{3+}$ | 4 to 16 percent |
| $R_1^+$ | 0.1 to 43 percent |
| (where $R_1^+$ is the total of $Li^+$, $Na^+$, and $K^+$) | |
| $R_2^{2+}$ | 12 to 53 percent |
| (where $R_2^{2+}$ is the total of $Mg^{2+}$, $Ca^{2+}$, $Sr^{2+}$, $Ba^{2+}$, and $Zn^{2+}$) | |
| $Cu^{2+}$ | 1.0 to 4.7 percent, | as well as comprises $F^-$ and $O^{2-}$ as anionic components.

19. The copper-containing glass according to claim 18, wherein the glass does not comprise a nitrate.

20. A near-infrared light-absorbing element comprised of the copper-containing glass according to claim 16.

21. A near-infrared light-absorbing filter comprising the near-infrared light-absorbing element according to claim 20.

22. Near-infrared light-absorbing glass comprising, denoted as cationic percentages, 23 to 41 percent of $P^{5+}$, 4 to 16 percent of $Al^{3+}$, 11 to 40 percent of $Li^+$, 3 to 13 percent of $Na^+$, 12 to 53 percent of $R^{2+}$ (where $R^{2+}$ denotes the total of $Mg^{2+}$, $Ca^{2+}$, $Sr^{2+}$, $Ba^{2+}$, and $Zn^{2+}$), and 2.6 to 4.7 percent of $Cu^{2+}$, and $F^-$ and $O^{2-}$ as anionic components;
   wherein the glass is fluorophosphates glass essentially comprising no arsenic and no lead, and denoted as having an anionic percentage of 25 to 48 percent of F.

23. The near-infrared light-absorbing glass according to claim 22, wherein the glass comprises $Zn^{2+}$ as a cationic component.

24. The near infrared light-absorbing glass according to claim 22, wherein the glass comprises, denoted as anionic percentages, 25 to 48 percent of $F^-$ and 52 to 75 percent of $O^{2-}$.

25. The near-infrared light-absorbing glass according to claim 22, wherein the glass has a liquid phase temperature of 750° C. or less.

26. A near-infrared light-absorbing element comprised of the near-infrared light-absorbing glass according to claim 22.

27. A near-infrared light-absorbing filter comprising a glass plate comprised of the near-infrared light-absorbing glass according to claim 22.

28. Near-infrared light-absorbing glass wherein,
- a thickness of the glass, at which the glass exhibits a property that wavelength at which a 50 percent transmittance is exhibited is 615 nm, is in a range of from 0.1 to 0.8 mm,
- a transmittance at a wavelength of 400 nm is 80 percent or more at the thickness at which the glass exhibits said property,
- a transmittance at a wavelength of 800 to 1000 nm is less than 5 percent, a the thickness at which the glass exhibits said property,
- a transmittance at a wavelength of 1200 nm is less than 20 percent at the thickness at which the glass exhibits said property, and
- the glass is fluorophosphates glass essentially comprising no arsenic and no lead, and denoted as having an anionic percentage of 25 to 48 percent of F.

29. The near-infrared light-absorbing glass according to claim 28, wherein the glass has a liquid phase temperature of 750° C. or less.

30. The near-infrared light-absorbing glass according to claim 28 which is copper-containing fluorophosphate glass.

31. A near-infrared light-absorbing element comprised of the near-infrared light-absorbing glass according to claim 28.

32. A near-infrared light-absorbing filter comprising a glass plate comprised of the near-infrared light-absorbing glass according to claim 28.

33. Near-infrared light-absorbing glass, wherein the glass exhibits properties, based on a thickness of 0.5 mm,
- that a first wavelength, at which a 50 percent transmittance is exhibited, is shorter than 630 nm,
- transmittance at a second wavelength of said first wavelength to 700 nm is less than 50 percent,
- transmittance at a third wavelength of 400 nm to said first wavelength is higher than 50 percent,
- the viscosity at a liquid phase temperature is 0.5 Pa·multidot·s or more, and
- the glass is copper-containing fluorophosphates glass essentially comprising no arsenic and no lead, and denoted as having an anionic percentage of 25 to 48 percent of F.

34. A near-infrared light-absorbing element comprised of the near-infrared light-absorbing glass according to claim 33.

35. A near-infrared light-absorbing filter comprising a glass plate comprised of the near-infrared light-absorbing glass according to claim 33.

36. A method of manufacturing a near-infrared light-absorbing formed glass article, wherein melted glass having a temperature of 710° C. or less is formed and cooled to manufacture a formed glass article comprised of the near-infrared light-absorbing glass according to claim 33.

\* \* \* \* \*